US 10,724,301 B2

(12) United States Patent
Jones et al.

(10) Patent No.: US 10,724,301 B2
(45) Date of Patent: Jul. 28, 2020

(54) VEHICULAR AUGER IMPLEMENT

(71) Applicant: Billy Goat Industries, Inc., Lee's Summit, MO (US)

(72) Inventors: Kirk Jones, Vista, CA (US); Stephen Eugene Longmeyer, Pleasant Hill, MO (US); Jon Olson, Lee's Summit, MO (US)

(73) Assignee: BILLY GOAT INDUSTRIES, INC., Lee's Summit, MO (US)

( * ) Notice: Subject to any disclaimer, the term of this patent is extended or adjusted under 35 U.S.C. 154(b) by 51 days.

(21) Appl. No.: 16/014,700

(22) Filed: Jun. 21, 2018

(65) Prior Publication Data
US 2018/0363376 A1 Dec. 20, 2018

Related U.S. Application Data

(63) Continuation-in-part of application No. 15/860,467, filed on Jan. 2, 2018, which is a continuation-in-part of application No. 14/155,287, filed on Jan. 14, 2014, now Pat. No. 10,041,301.

(60) Provisional application No. 62/441,220, filed on Dec. 31, 2016.

(51) Int. Cl.
*E21B 7/02* (2006.01)
*B60R 11/06* (2006.01)
*B60R 11/00* (2006.01)
*E21B 10/44* (2006.01)

(52) U.S. Cl.
CPC .............. *E21B 7/028* (2013.01); *B60R 11/06* (2013.01); *E21B 7/027* (2013.01); *B60R 2011/004* (2013.01); *E21B 10/44* (2013.01)

(58) Field of Classification Search
CPC . E21B 7/02; E21B 7/027; E21B 7/028; E21B 7/07; E21B 11/005; E21B 10/44
See application file for complete search history.

(56) References Cited

U.S. PATENT DOCUMENTS

| 2,474,981 | A | 7/1949 | Mccardell |
| 2,562,276 | A | 7/1951 | Kandle |
| 2,639,982 | A | 5/1953 | Kalbach |
| 2,774,568 | A | 12/1956 | Jones |
| 3,367,427 | A | 2/1968 | Baumgardner |
| 3,391,890 | A | 7/1968 | Perbal |

(Continued)

FOREIGN PATENT DOCUMENTS

| EP | 774542 A1 | 5/1997 |
| WO | 2010114462 A1 | 10/2010 |

*Primary Examiner* — D. Andrews
*Assistant Examiner* — Manuel C Portocarrero
(74) *Attorney, Agent, or Firm* — Foley & Lardner LLP

(57) ABSTRACT

A vehicular auger implement includes an auger having a bit; a walk-behind vehicle having front and rear ends, a forward anchor point, and a rear anchor point; linkage coupling the auger to the walk-behind vehicle; and an actuator for causing the linkage to move between raised and lowered configurations. The linkage includes first, second, and third links. The first link is coupled to the walk-behind vehicle and is rotatable about the forward anchor point. The second link is coupled to and is rotatable about the first link. The second link supports the auger. The third link is coupled to and is rotatable about the second link. The third link is also coupled to the walk-behind vehicle and is rotatable about the rear anchor point.

20 Claims, 18 Drawing Sheets

(56) References Cited

U.S. PATENT DOCUMENTS

| | | | |
|---|---|---|---|
| 3,700,045 | A | 10/1972 | Coontz |
| 3,789,931 | A | 2/1974 | Quinn |
| 4,961,471 | A | 10/1990 | Ovens |
| 5,158,146 | A | 10/1992 | Fuller |
| 5,363,925 | A | 11/1994 | Gallagher |
| 5,542,476 | A | 8/1996 | Hansen |
| 5,556,217 | A | 9/1996 | Deyo et al. |
| 5,836,402 | A | 11/1998 | Jones |
| 5,957,213 | A * | 9/1999 | Loraas .................... E02F 3/96 111/101 |
| 6,056,065 | A | 5/2000 | Campbell et al. |
| 6,260,633 | B1 | 7/2001 | Machek et al. |
| 6,305,882 | B1 | 10/2001 | Coast et al. |
| 6,676,916 | B2 | 1/2004 | Keck et al. |
| 6,681,470 | B1 | 1/2004 | Scott |
| 6,868,923 | B2 | 3/2005 | Mitchell |
| 6,889,779 | B2 | 5/2005 | Skarlupka, IV et al. |
| 7,284,625 | B2 | 10/2007 | Jones |
| 7,387,923 | B2 | 6/2008 | Chou et al. |
| 7,600,594 | B2 | 10/2009 | Jones |
| 7,935,192 | B2 | 5/2011 | Silverman et al. |
| 8,397,835 | B1 | 3/2013 | Lyngaas |
| 10,041,301 | B2 | 8/2018 | Jones |
| 2004/0031617 | A1 | 2/2004 | Skarlupka, IV et al. |
| 2004/0195285 | A1 | 10/2004 | Pinard |
| 2006/0011358 | A1 | 1/2006 | Motosko |
| 2010/0224746 | A1 | 9/2010 | Johnson et al. |
| 2011/0266411 | A1 | 11/2011 | Silverberg et al. |
| 2014/0250739 | A1 | 9/2014 | Distefanis, Jr. |

* cited by examiner

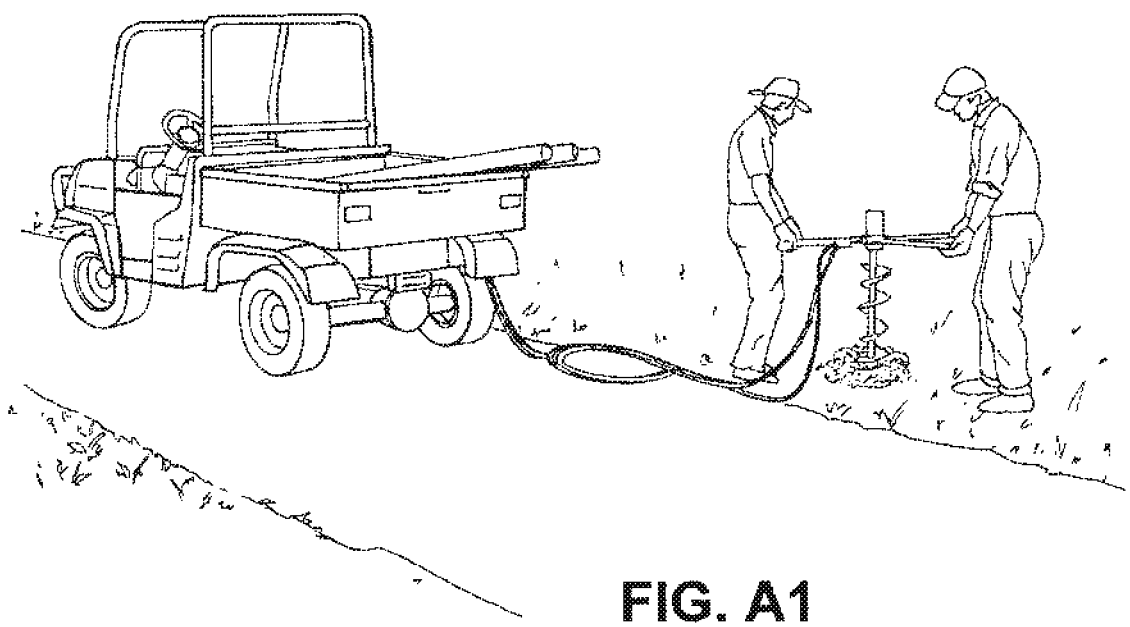
FIG. A1
Prior Art
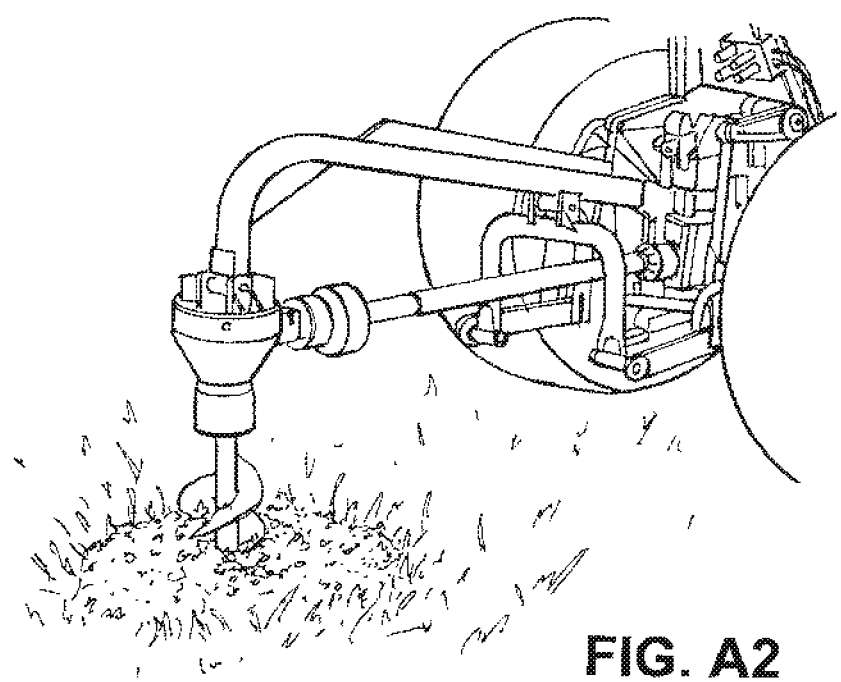
FIG. A2
Prior Art

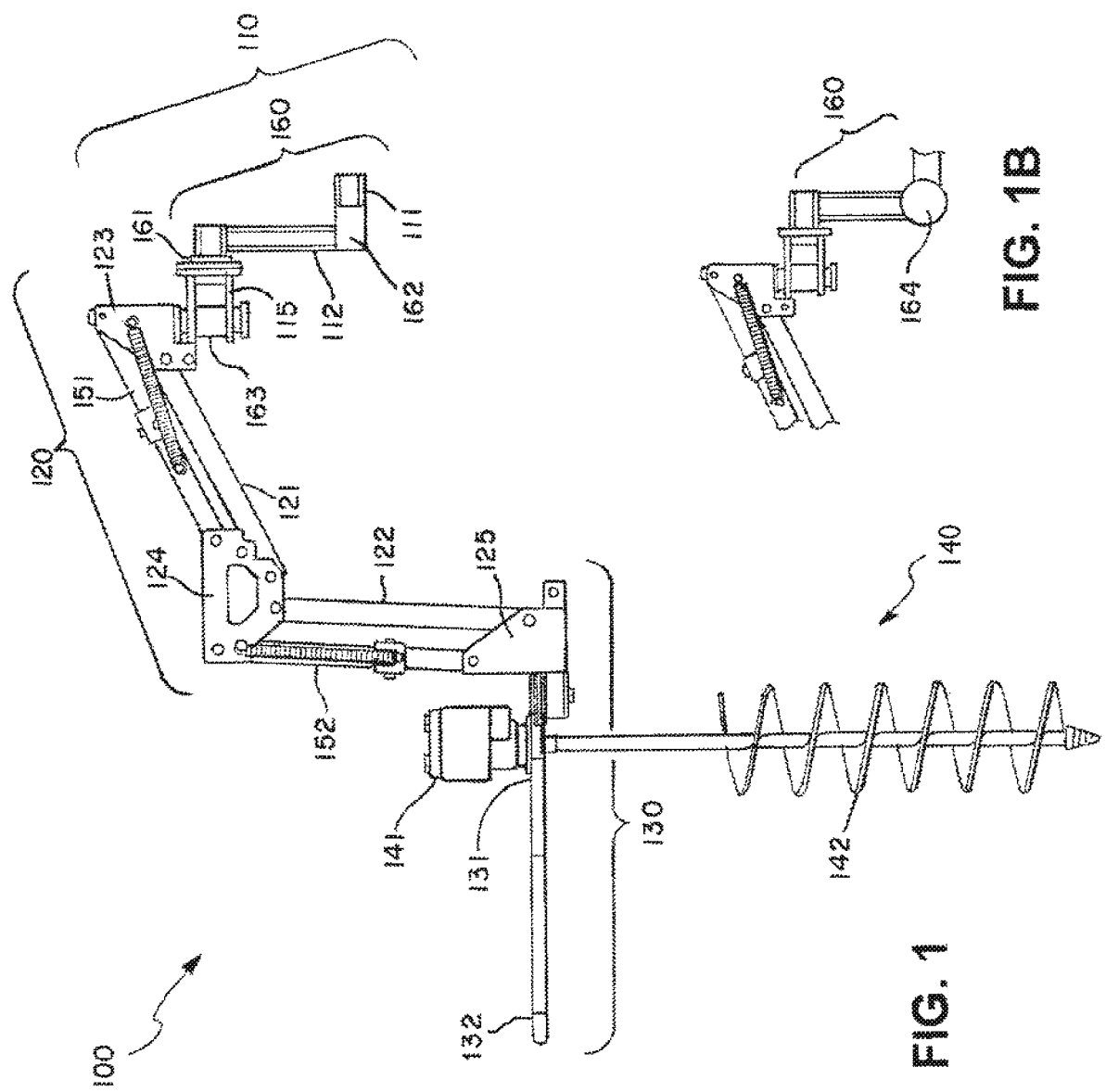

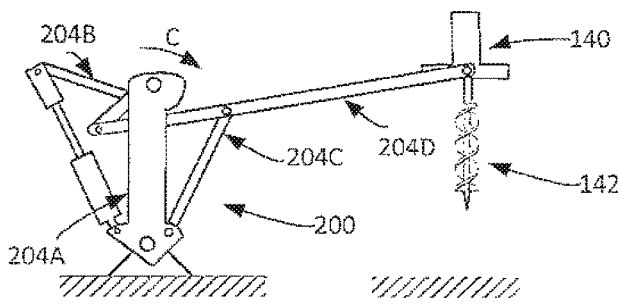 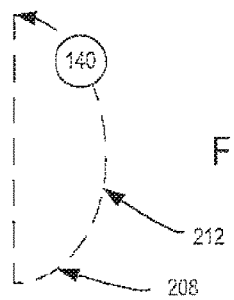
FIG. 12A
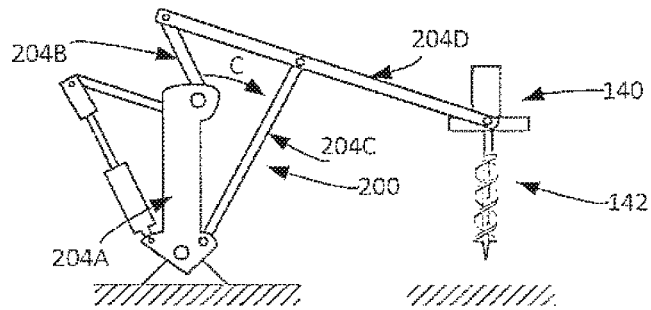 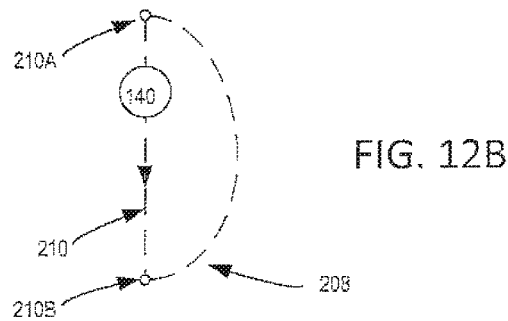
FIG. 12B
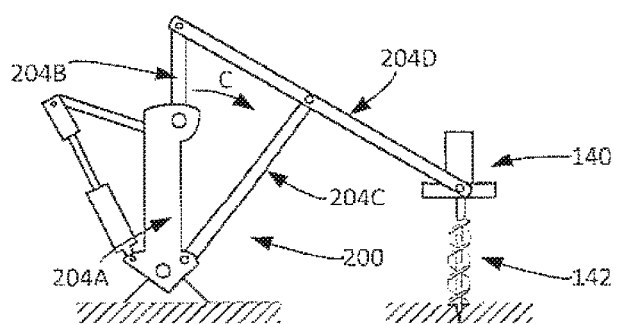 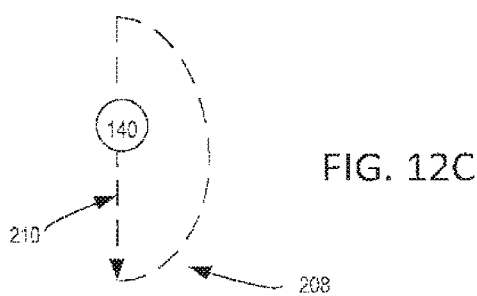
FIG. 12C
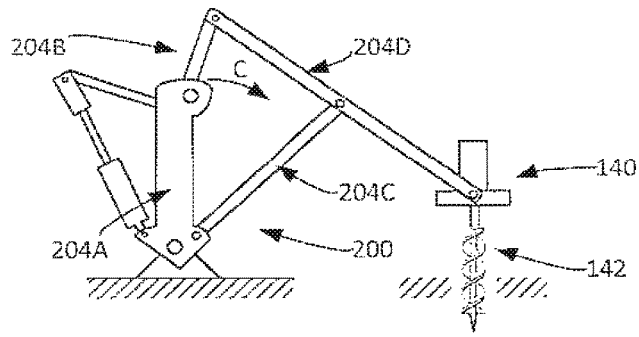 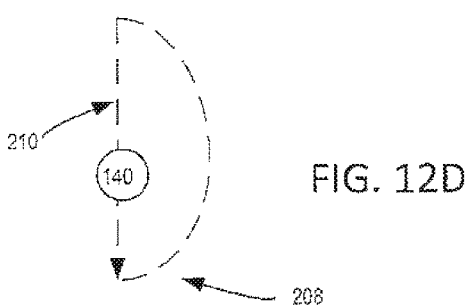
FIG. 12D
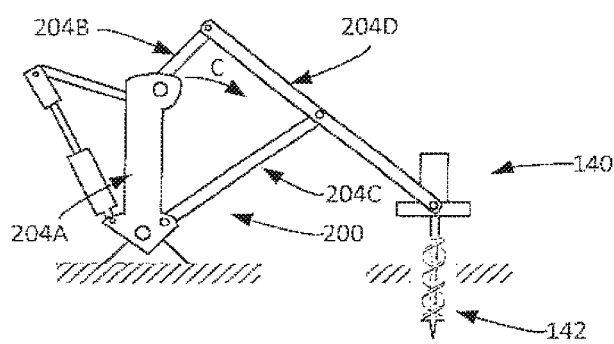 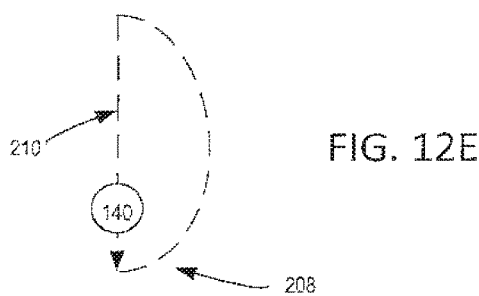
FIG. 12E

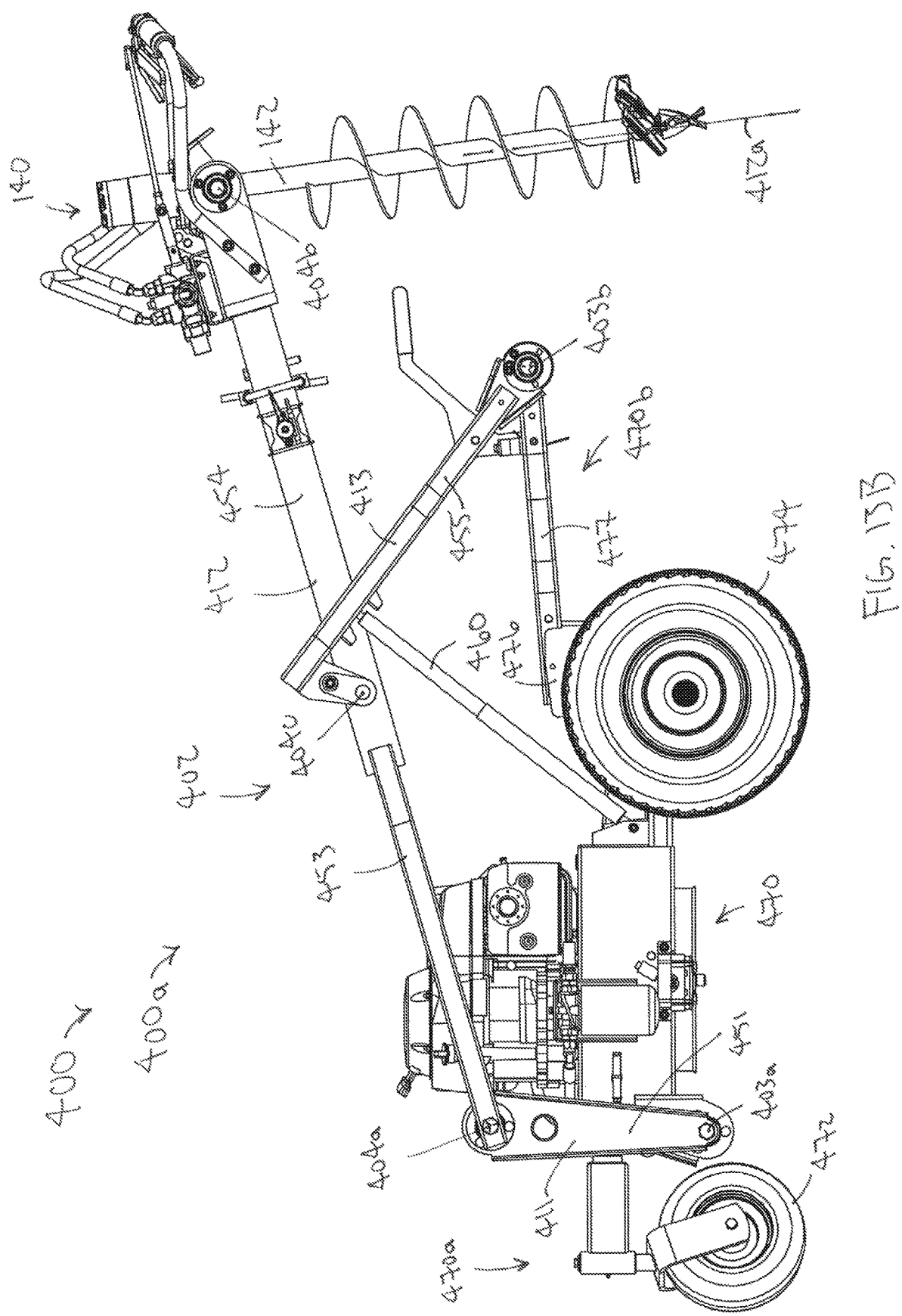

VEHICULAR AUGER IMPLEMENT

CROSS-REFERENCE TO RELATED APPLICATIONS

This application: (a) is a continuation-in-part of U.S. patent application, Ser. No. 15/860,467; (b) is a continuation-in-part of U.S. patent application, Ser. No. 14/155,287, filed Jan. 14, 2014; and (c) claims priority to U.S. Provisional Patent Application, Ser. No. 62/441,220, filed Dec. 31, 2016. The disclosure of each of these applications is incorporated by reference herein in its entirety.

FIELD OF THE DISCLOSURE

The disclosure relates generally to the field of augers. More specifically, the disclosure relates to the field of mobile auger implements.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to an embodiment, a vehicular auger implement configured to be operated by a single operator comprises an auger having a bit. The implement includes a four bar linkage comprising a first bar, a second bar, a third bar, and a fourth bar. The first bar is coupled to each of the second bar and a hydraulically actuated arm. The auger is operably coupled to the fourth bar. The four bar linkage is configured to convert a rotational motion of the second bar to a vertical motion of the auger. A vehicle to which the auger implement is coupled is configured to remain stationary while a hole is bored using the vertical motion of the auger.

According to another embodiment, a method for eliminating a lateral motion of a vehicle of a vehicular auger implement during operation of an auger comprises the step of providing the auger implement. The auger implement includes a Hoeckens linkage having a first bar, a second bar, a third bar, and a fourth bar. The first bar is coupled to the second bar. The fourth bar is coupled to each of the second bar and the third bar. The auger is operably coupled to the fourth bar. The method includes the step of causing the second bar to rotate about the first bar to cause the fourth bar to move in a D-shaped path. The method comprises the step of using a vertical leg of the D-shaped path to drill a hole with a bit of the auger. The auger implement is configured to be operated by a single operator.

According to still another embodiment, a vehicular auger implement comprises an auger having a bit. The implement has a four bar linkage comprising a first bar, a second bar, a third bar, and a fourth bar. The first bar is coupled to the second bar. The auger is operably coupled to the fourth bar. The four bar linkage is configured to convert a rotational motion of the second bar to a vertical motion of the auger. A vehicle to which the auger implement is coupled is configured to remain stationary while a hole is bored using the vertical motion of the auger.

According to yet another embodiment, a vehicular auger implement includes an auger having a bit; a walk-behind vehicle having front and rear ends, a forward anchor point, and a rear anchor point; linkage coupling the auger to the walk-behind vehicle; and an actuator for causing the linkage to move between raised and lowered configurations. The linkage includes first, second, and third links. The first link is coupled to the walk-behind vehicle and is rotatable about the forward anchor point. The second link is coupled to and is rotatable about the first link. The second link supports the auger. The third link is coupled to and is rotatable about the second link. The third link is also coupled to the walk-behind vehicle and is rotatable about the rear anchor point.

According to still yet another embodiment, a vehicular auger implement includes an auger having a bit; a walk-behind vehicle having front and rear ends, a forward anchor point, and a rear anchor point higher than the forward anchor point; and linkage coupling the auger to the walk-behind vehicle, the linkage being movable between raised and lowered configurations. The linkage includes first, second, and third links. The first link is coupled to the walk-behind vehicle and is rotatable about the forward anchor point. The second link supports the auger and is coupled to and is rotatable about the first link. The third link is coupled to and is rotatable about the second link. The third link is also coupled to the walk-behind vehicle and is rotatable about the rear anchor point.

BRIEF DESCRIPTION OF THE SEVERAL VIEWS OF THE DRAWINGS

Illustrative embodiments of the present disclosure are described in detail below with reference to the attached drawing figures and wherein:

FIG. A1 show a prior art two-man auger;

Figure 2:
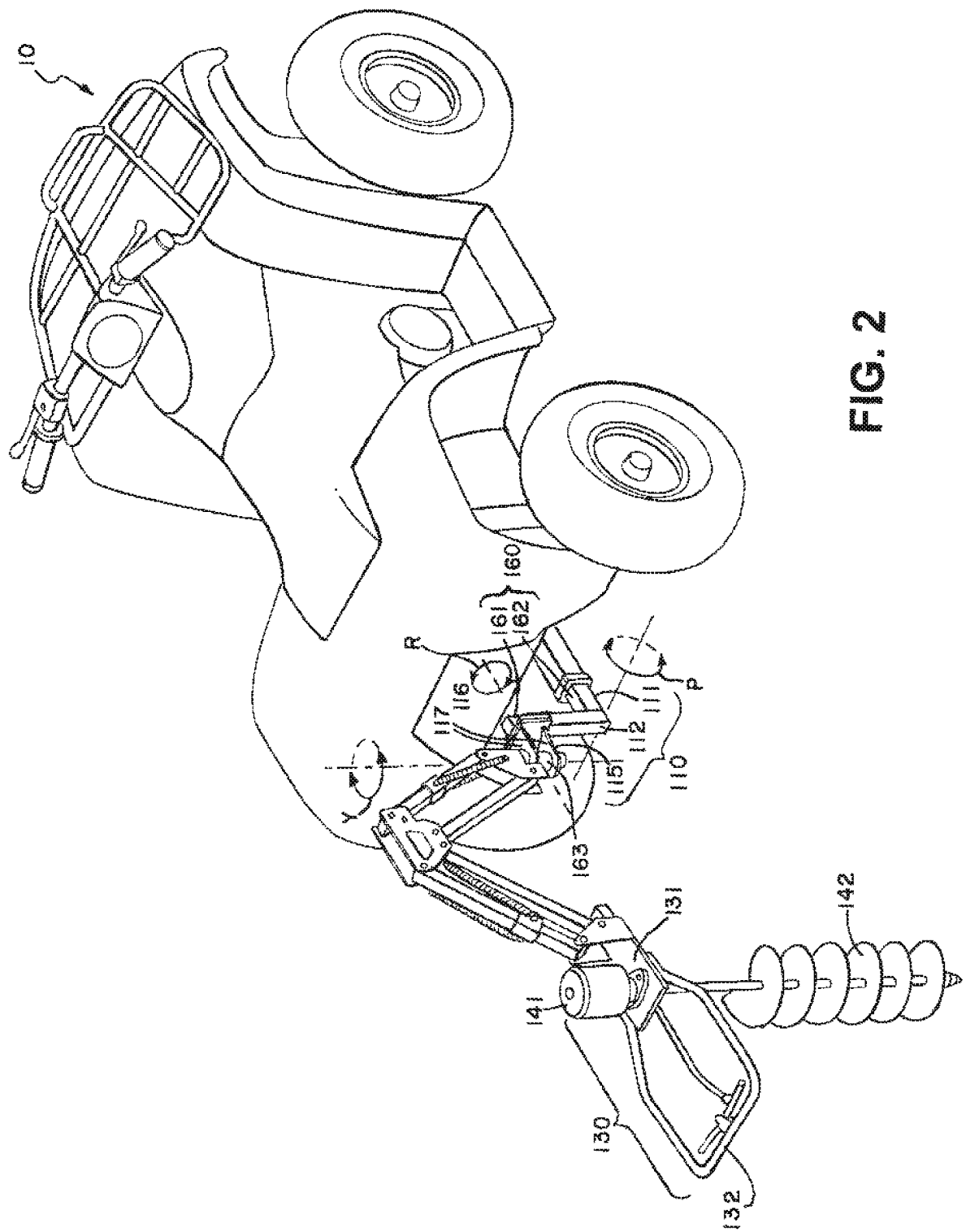
Figure 3:
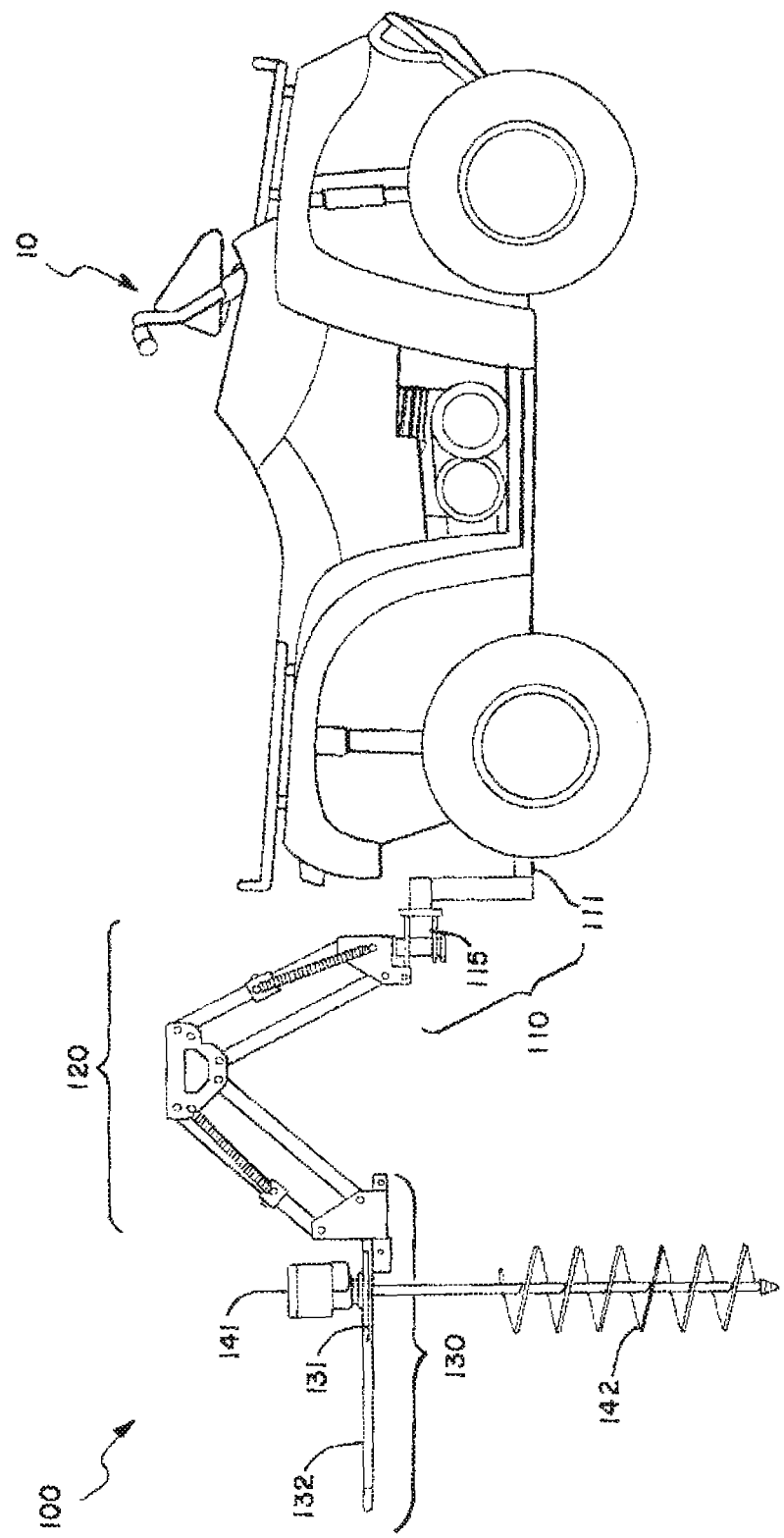
Figure 4:
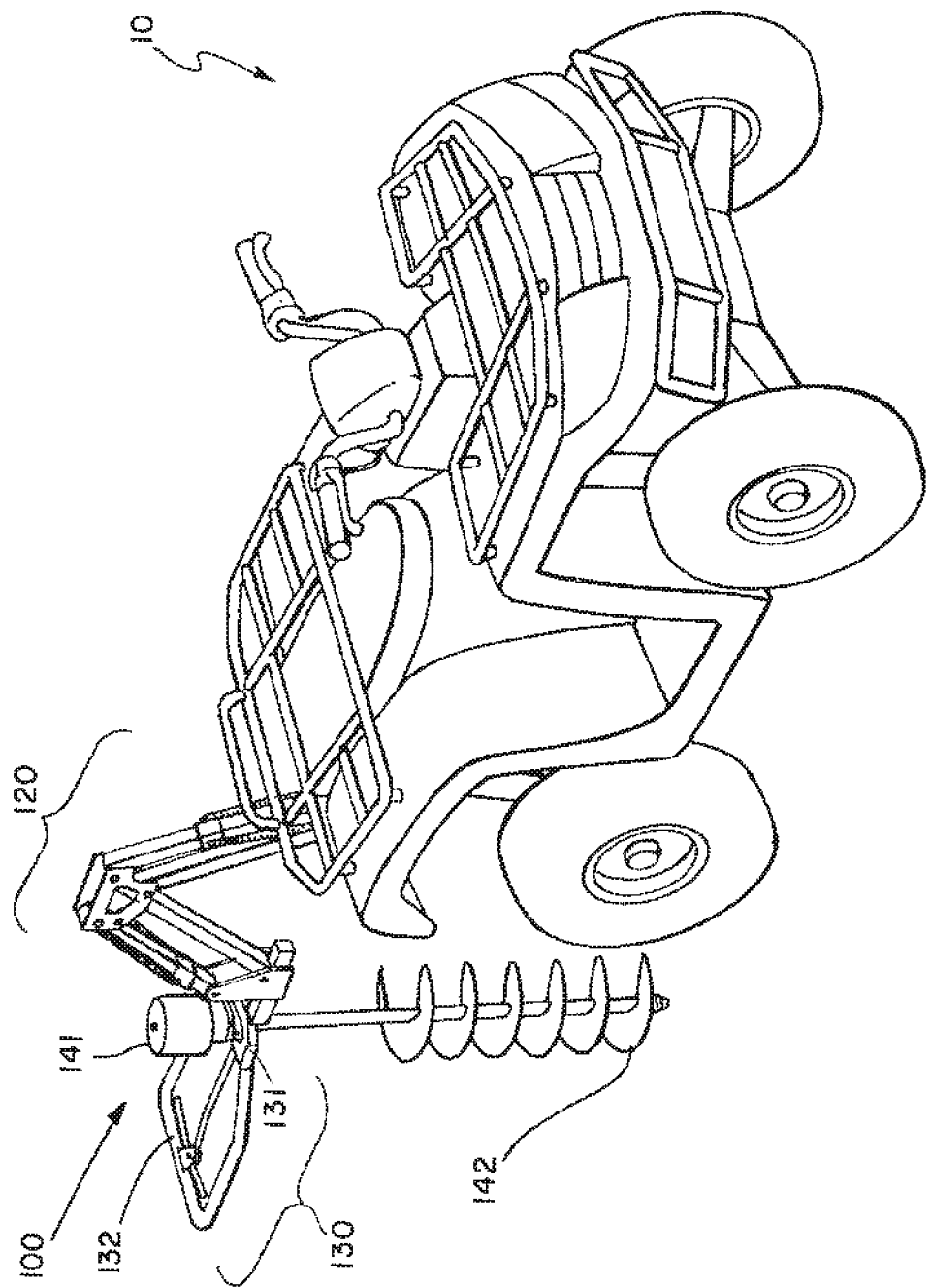
Figure 5:
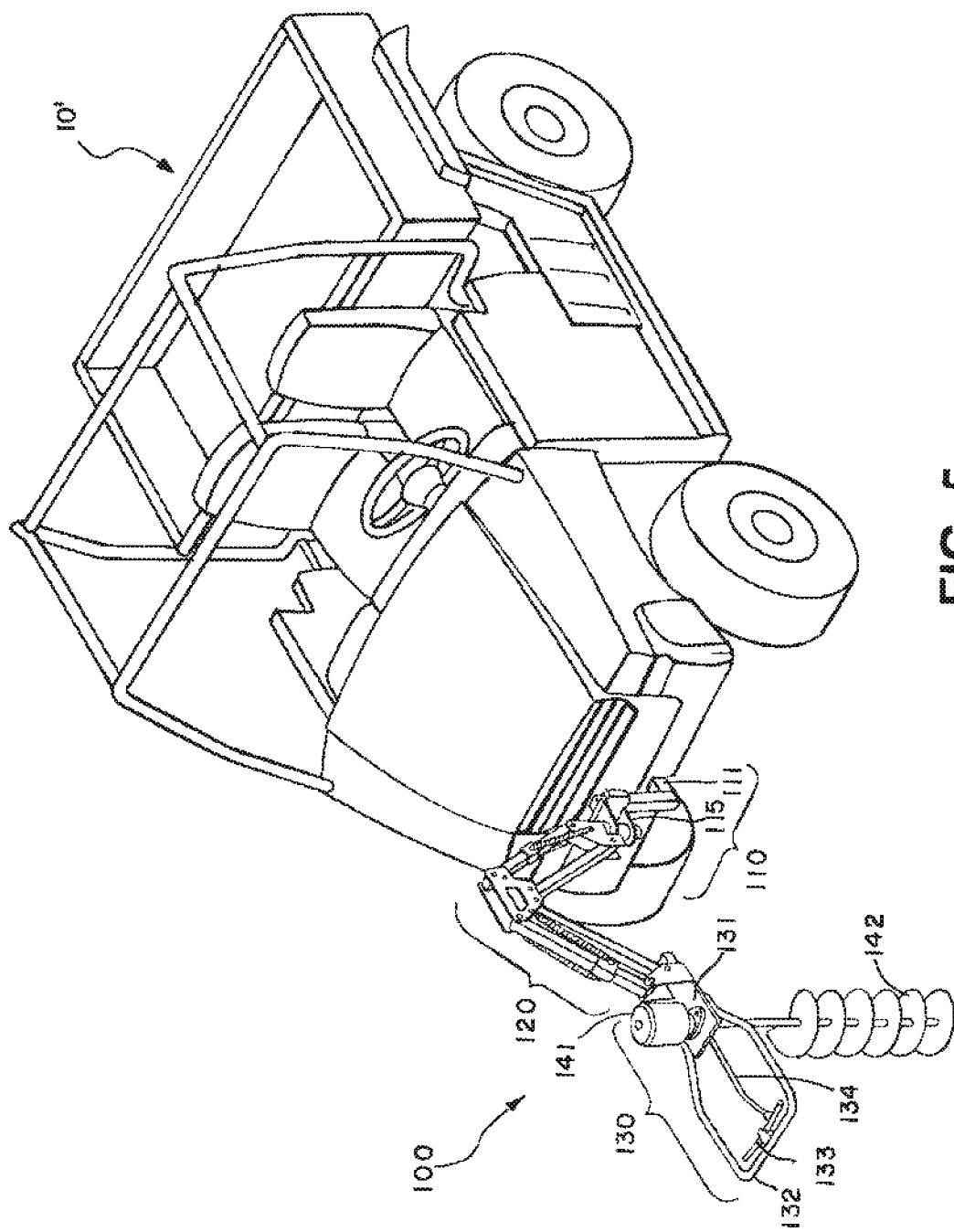
Figure 6:
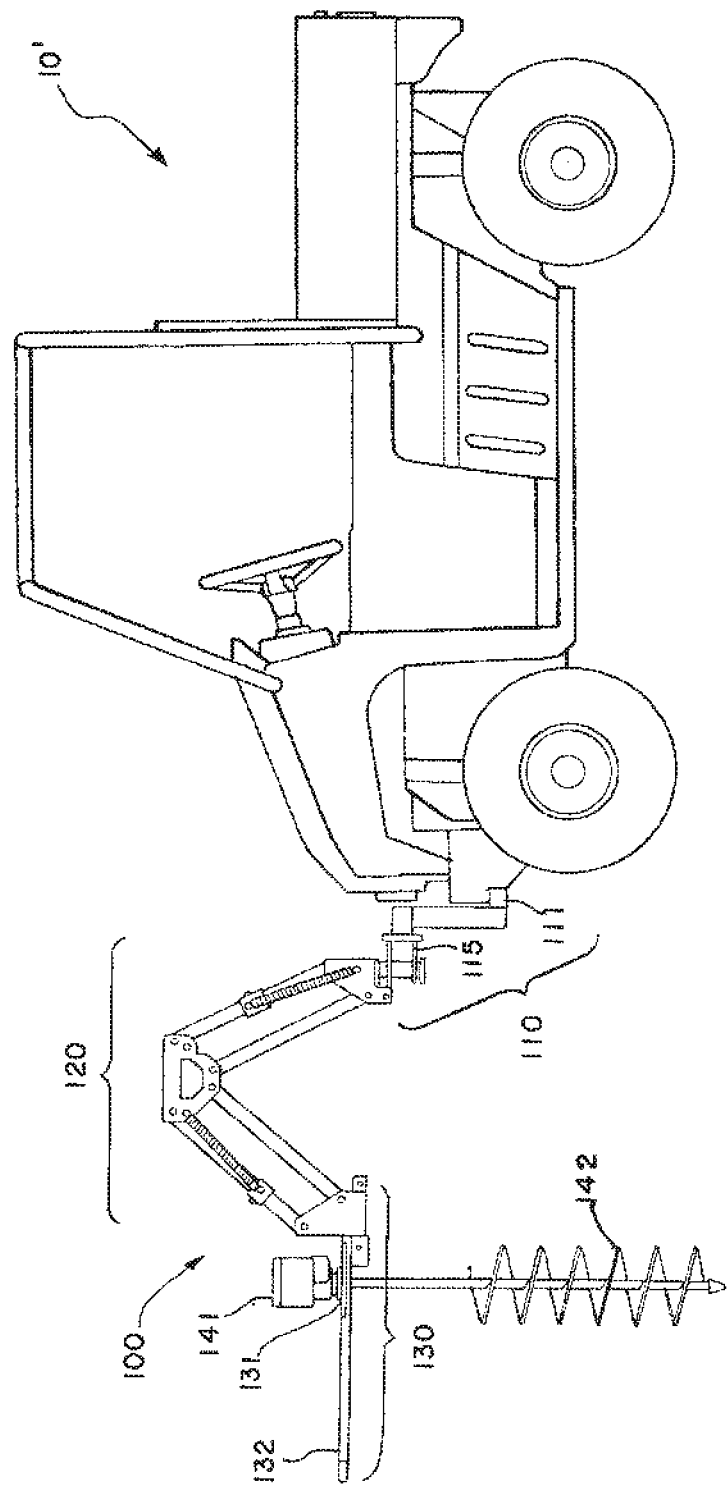
Figure 7:
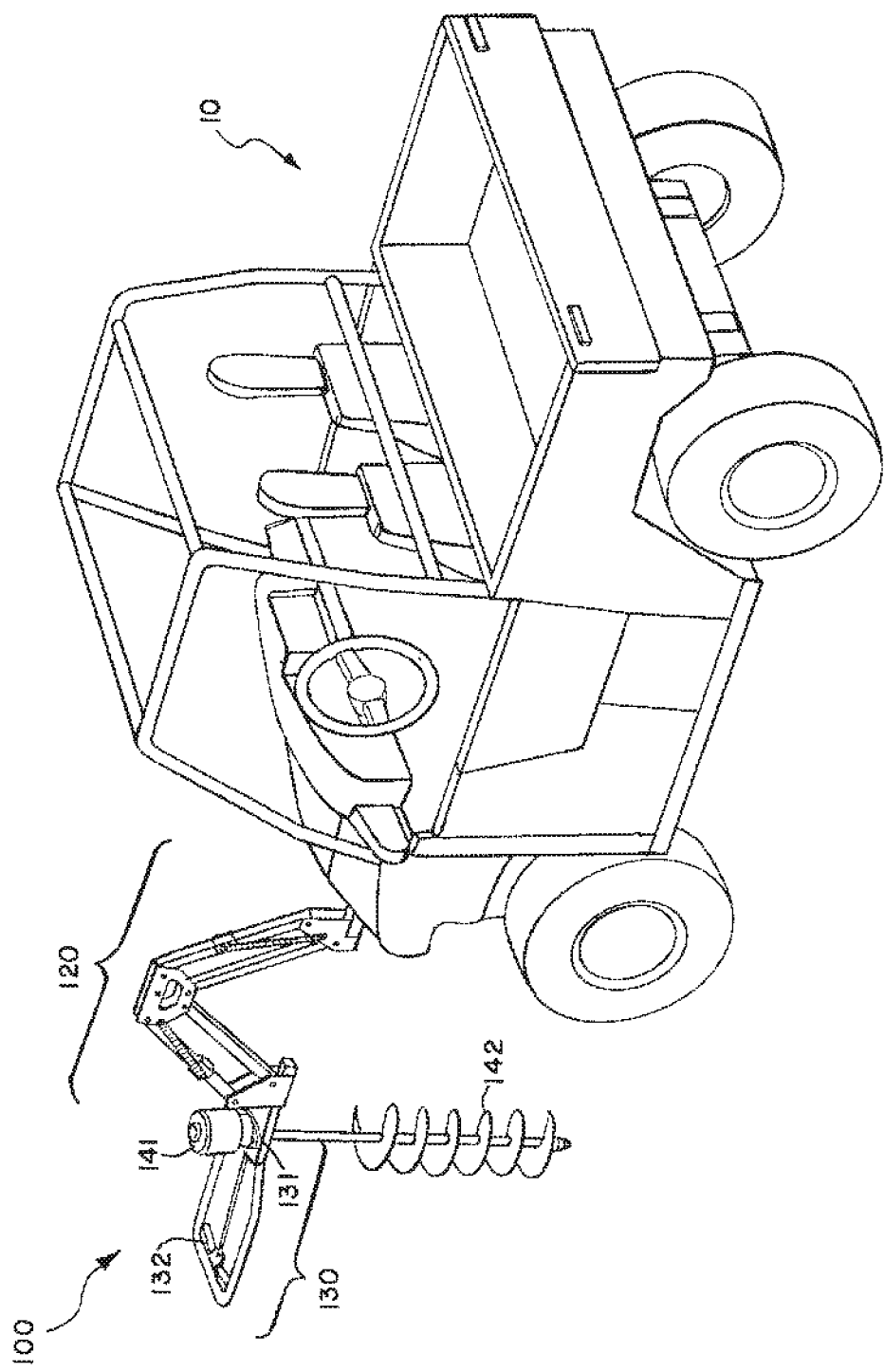
Figure 8A:
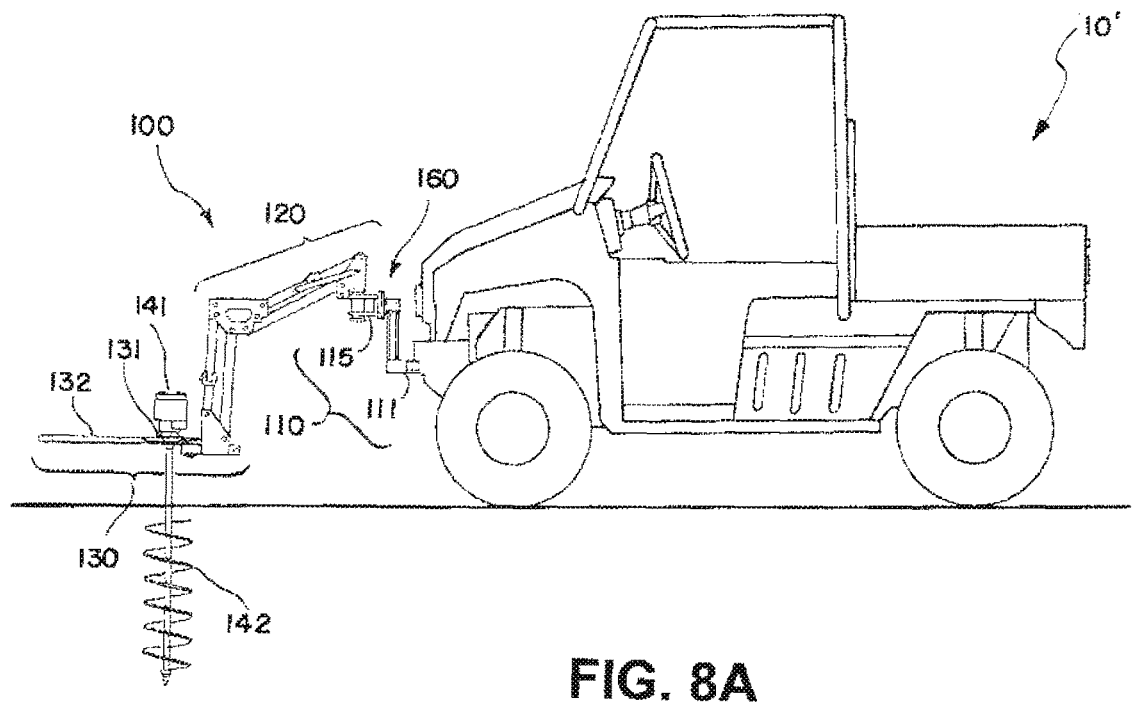
Figure 8B:
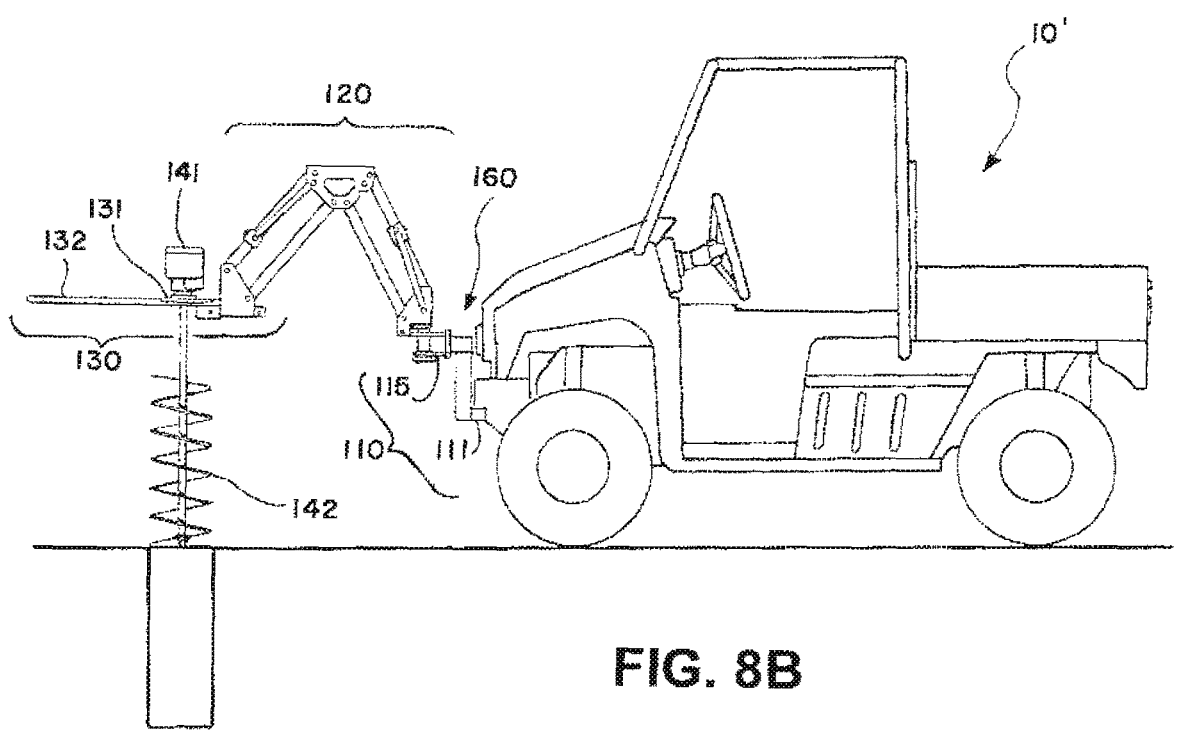
Figure 9:
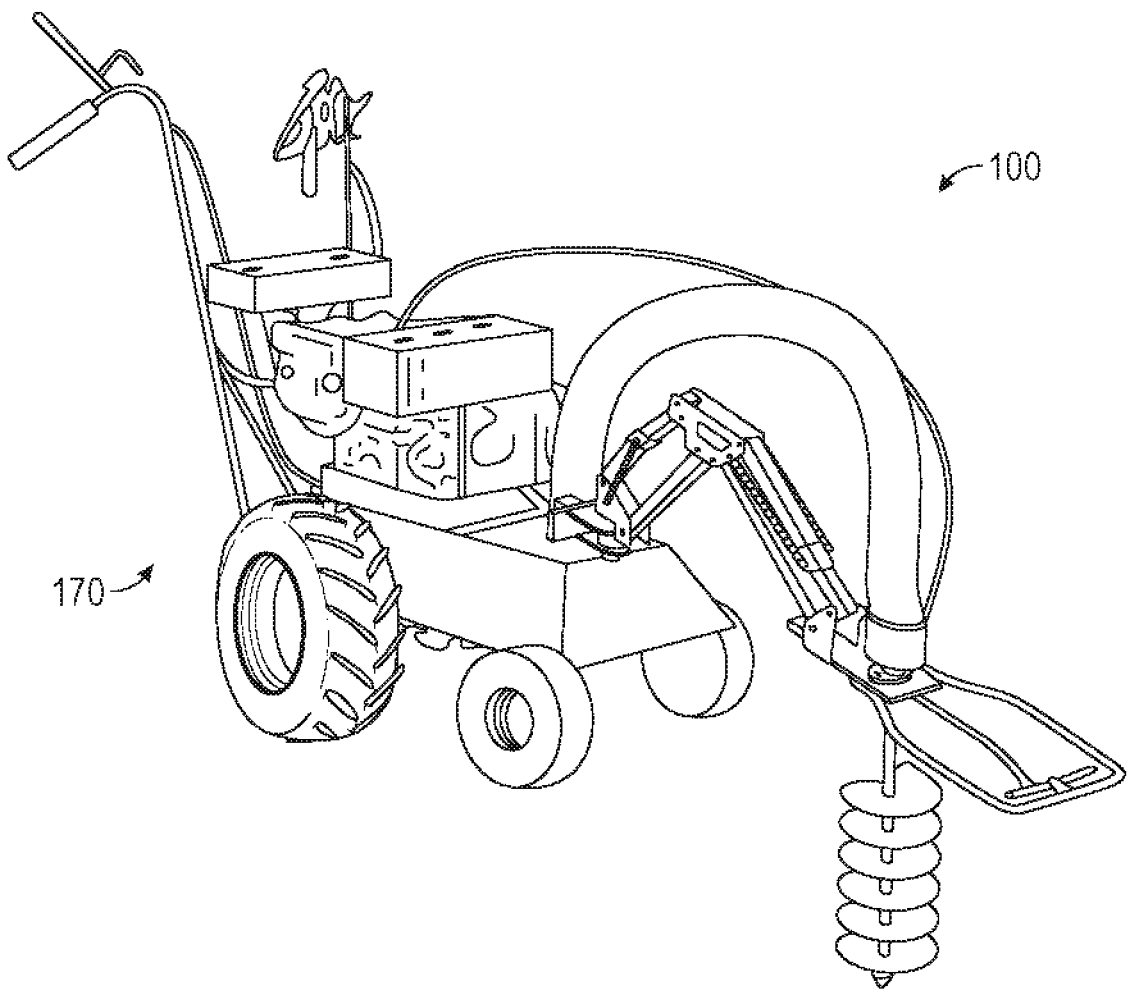
Figure 10:
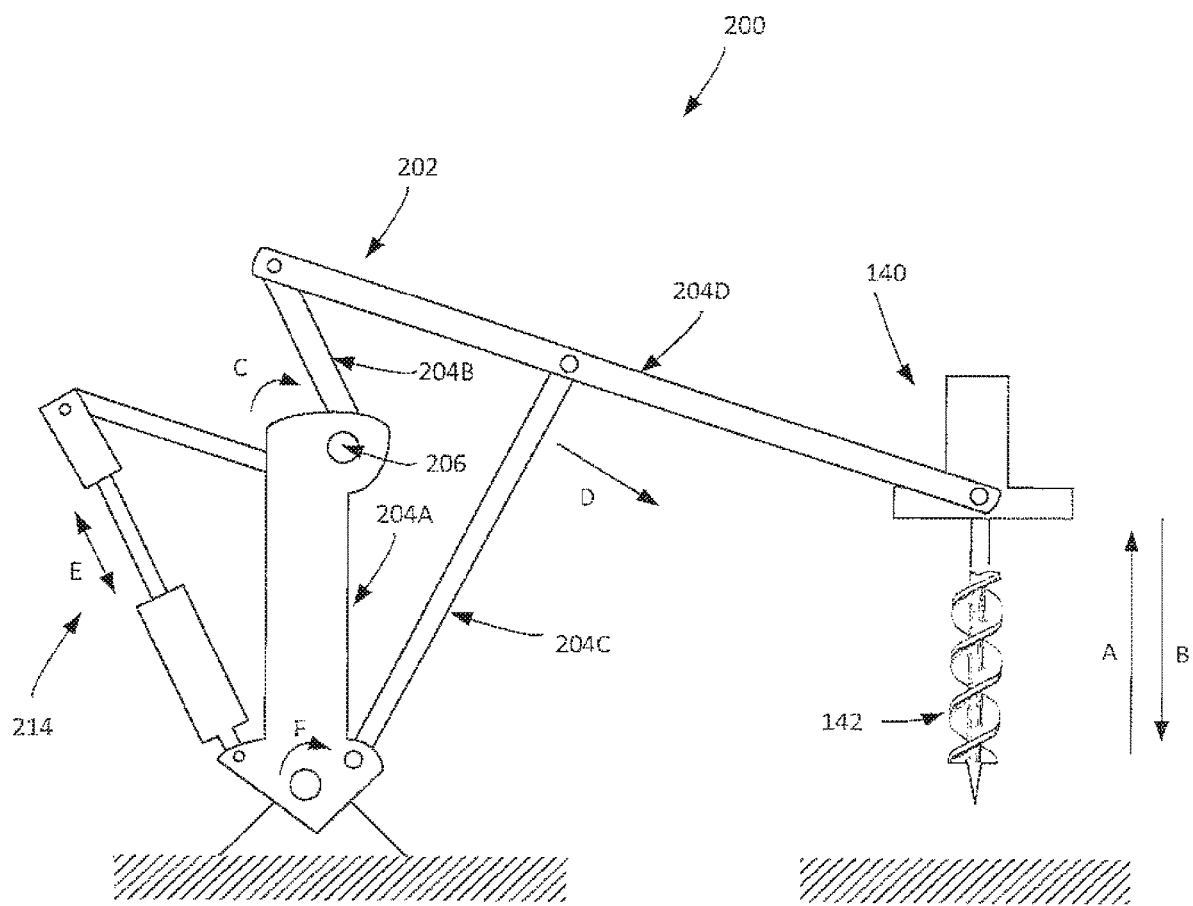
Figure 11:
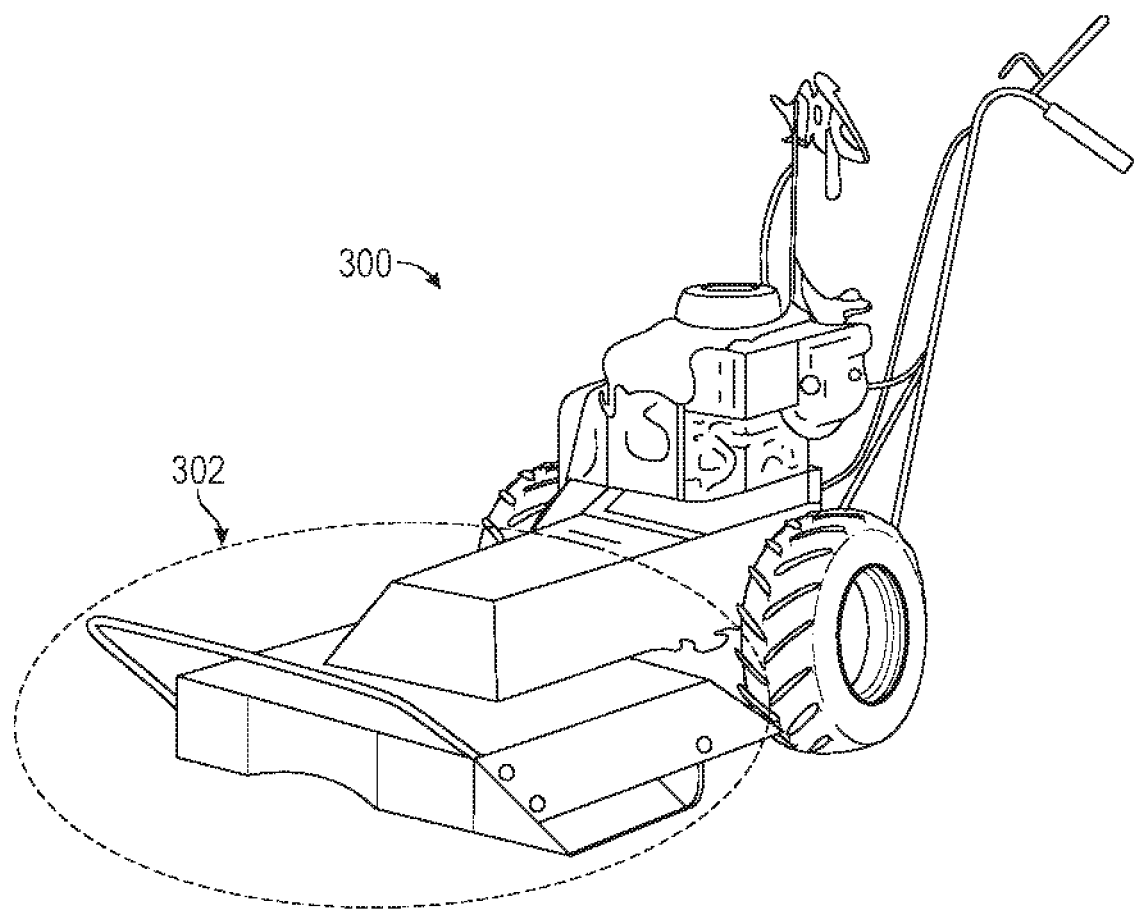
Figure 13A:
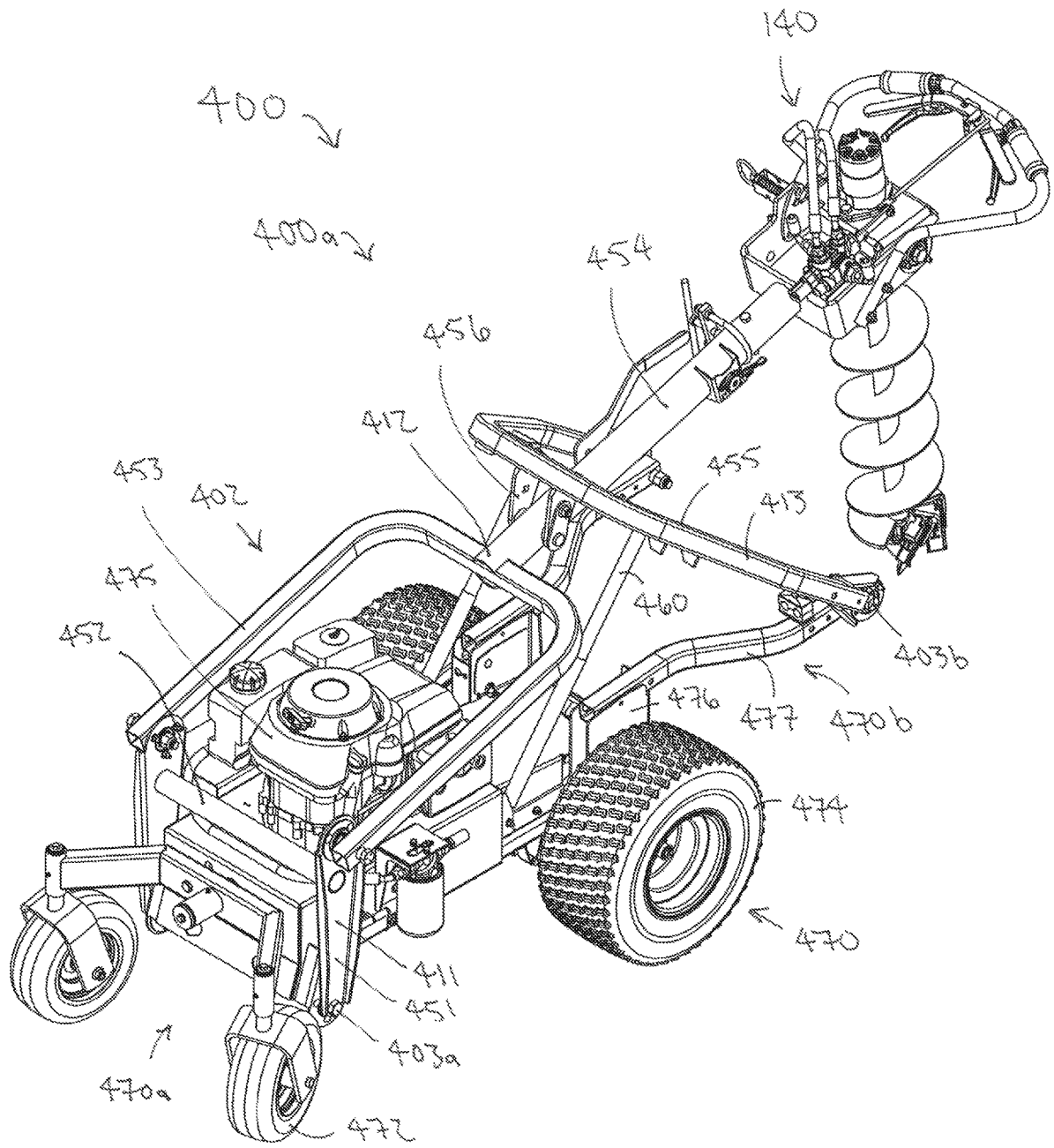
Figure 13C:
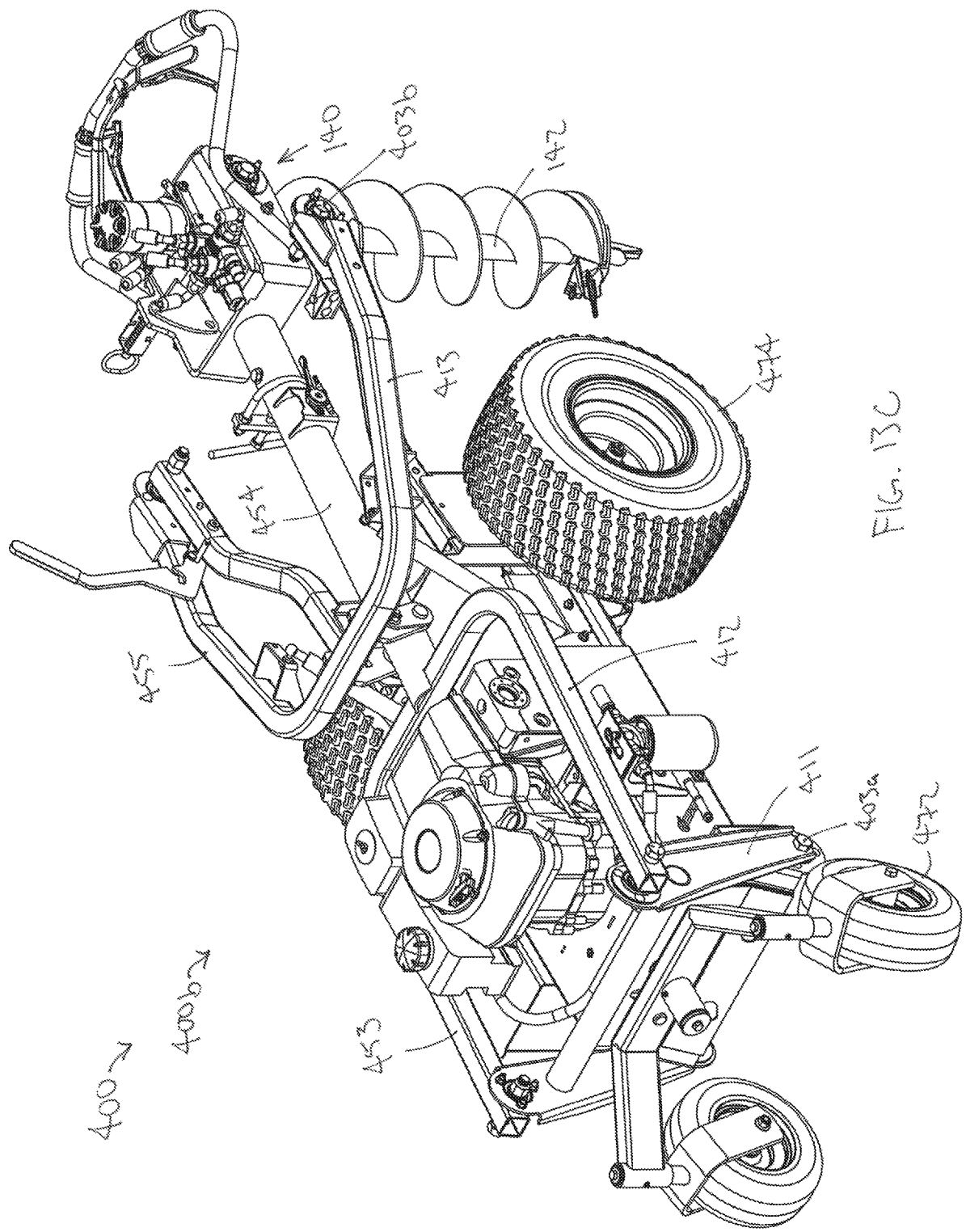
Figure 13D:
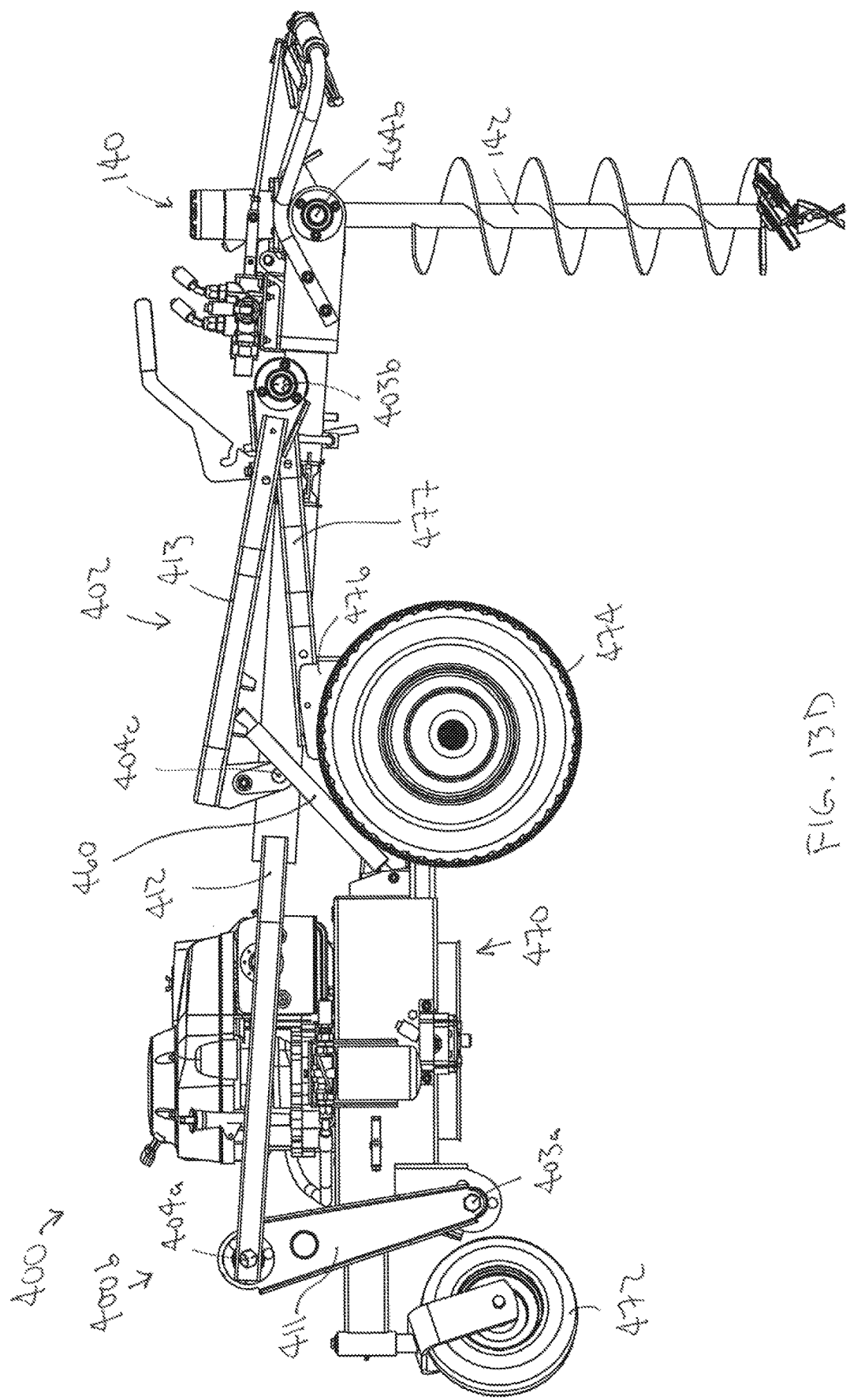
Figure 14:
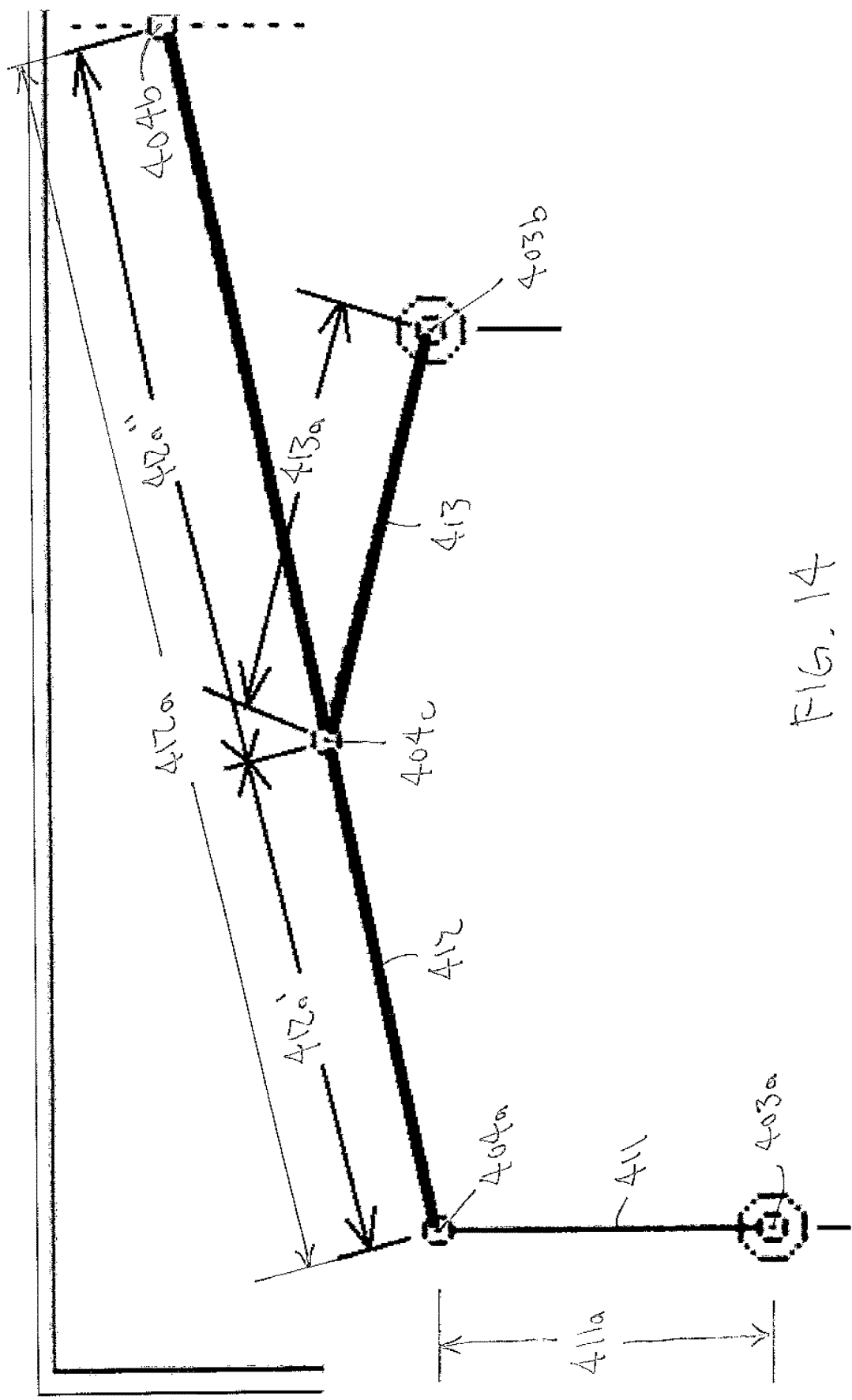

FIG. A2 shows a prior art auger connected to a three-point hitch on the rear of a tractor having a mechanical power take-off shaft;

FIG. 1 is a side view of an auger implement, according to an example embodiment;

FIG. 1B is a side view of a gimbal joint incorporated into the auger implement of FIG. 1, according to an example embodiment;

FIG. 2 is a rear perspective view of the vehicular auger implement of FIG. 1 mounted to an ATV;

FIG. 3 is a side view of the vehicular auger implement of FIG. 1 mounted to the ATV;

FIG. 4 is a front perspective view of the vehicular auger implement of FIG. 1 mounted to the ATV;

FIG. 5 is a front perspective view of the vehicular auger implement of FIG. 1 mounted to a tow receiver of a UTV;

FIG. 6 is a side view of the vehicular auger implement of FIG. 1 mounted to the UTV;

FIG. 7 is a front perspective view of the vehicular auger implement of FIG. 1 mounted to the UTV;

FIGS. 8A and 8B collectively illustrate the workings of a central articulating section of the vehicular auger implement of FIG. 1;

FIG. 9 is a perspective view of example outdoor power equipment for mounting the auger implement of FIG. 1;

FIG. 10 shows a side view of an alternate embodiment of the auger implement of FIG. 1;

FIG. 11 shows a perspective view of a PRIOR ART walk-behind mower that may be retrofitted for the mounting of the auger implement of FIG. 10;

FIGS. 12A-12E schematically represent successive movement of arms of a linkage of the auger implement of FIG. 10;

FIG. 13A is a perspective view of another embodiment of the disclosed auger implement, shown with the linkage at a raised configuration;

FIG. 13B is a side view of the auger implement of FIG. 13A, shown with the linkage at the raised configuration;

FIG. 13C is a perspective view of the auger implement of FIG. 13A, shown with the linkage at a lowered configuration;

FIG. 13D is a side view of the auger implement of FIG. 13A, shown with the linkage at the lowered configuration; and FIG. 14 schematically represents the linkage of the auger implement of FIG. 13A.

DETAILED DESCRIPTION

High power augers that provide an output torque of about 200 to 300 ft. lbs. are traditionally operated by two people. These are the earth augers that drive long and large diameter large auger bits with, for example, a 1¼ in. square female snap connection, a 1⅜ in. hex male pinned connection, or other robust connector. These augers are usually heavy, gasoline powered, and require two people to manually position and operate. The operators must also attempt to keep the auger drilling vertically by sight. These types of augers are dangerous for the operators and are exhausting to use. FIG. A1 depicts a typical two-man auger being manipulated by hand and driven by a hydraulic circuit.

Another style is to have a self-contained "one man" operated unit that is mounted on wheels. These are more expensive and really require at least two people if the ground is not flat as these units are very heavy and are virtually impossible to keep positioned by one person on a slope.

In other cases, the auger is theoretically enabled for one-man operation by being partially supported by a telescoping "torque tube" that is attached to a trailer hitch or other anchored object. In use, however, the torque tube pivots about its end connections and the operator must strive to adjust the relative angle of the auger in order to move the auger straight up and straight down.

In another prior art arrangement as shown in FIG. A2 (i.e. on the back of a tractor), the auger is connected to a 3-point hitch and driven by a mechanical power take-off. As shown, the auger is pivoted about on a heavy-duty support member such that the auger bit tends to rotate around the support members pivot point as it drills down into the earth. In typical operation, this still requires two people—a spotter and a driver. The spotter guides the driver in order to position the point of the auger bit over the desired bore and then the team bores the hole with the auger bit. As the auger bit advances into the soil, the gear box begins to pivot away from the tractor around the link and, because of this, the driver inches forward to prevent the auger tip from moving toward the tractor's original location.

Vehicular auger mounts have been developed for mounting augers to vehicles, including smaller vehicles such as all-terrain vehicles (ATVs). A typical ATV is a small open single-rider vehicle having four wheels and is generally designed for off-road use on various types of terrain or rough ground. The American National Standards Institute (ANSI) defines an ATV as a vehicle that travels on low-pressure tires, with a seat that is straddled by the operator, along with motorcycle-like handlebars for steering control. ATVs usually do not have windshields.

Other vehicles of similar size, power, and all-terrain capability have different names. For example, a UTV (utility task vehicle), sometimes called a "side-by-side," is a four-wheel drive vehicle that usually is slightly larger than an ATV, usually has a conventional steering wheel, and provides seating for 2 or 4 people in a side-by-side arrangement. UTVs sometimes have windshields. UTVs often have small truck beds and, as a result, are popular among golf course maintenance personnel, parks and recreation departments, and any other users who need to travel over uneven terrain with people and materials.

ATVs and UTVs are traditionally sold by well-known manufacturers such as HONDA®, KAWASAKI®, ARCTIC CAT®, YAMAHA®, CAN-AM®, SUZUKI®, and POLARIS®. For the sake of simplicity, this application will refer to vehicles in this general class as "ATVs."

An ATV is usually powered by an internal combustion engine that runs on gasoline or other suitable fuel (e.g. propane, diesel fuel, etc.). For moving the ATV, the engine is usually coupled to a pair of rear-drive wheels via the engine's drive shaft and an intermediate transmission. Some ATVs even include four wheel drive power train.

ATVs are often used for recreational purposes, but ATV manufacturers are also making models that are well-suited for use as general purpose work vehicles or utility vehicles (e.g. on a farm or other large property, for military purposes, etc.).

Due to the ever increasing demand to use ATVs as work vehicles, various implements have been designed to convert ATVs into more useful vehicles, such as lawn mowers, log splitters, electric generators, etc. However, these attachments normally come with significant drawbacks in that duplicate engines are needed to run the separate implements that may or may not be pulled by the ATV. Such is very costly and needlessly weighs down the ATV. Conventional implements are custom installed and are cumbersome and time consuming to utilize because they are required to be bolted onto the ATV engine and have to be completely unbolted and disassembled to operate the ATV in a normal function when not using the implement.

U.S. Pat. Nos. 7,284,625 and 7,600,594 disclose a unique hydraulic power take-off (PTO) system for use with an ATV. The two patents more specifically disclose a quick connect/disconnect assembly for allowing a power transfer unit to be connected to and disconnected from an ATV. The power transfer unit detachably connects to an output shaft associated with the rotation of the ATV's engine (usually the engine's drive shaft) and then powers an implement connected to, carried by, or located near the ATV. The power transfer unit beneficially eliminates the need to have separate engines for the implements.

The power transfer unit may be a hydraulic pump that forces fluid through a hydraulic circuit and drives a hydraulic motor associated with the implement. The exemplary implements that could be driven with the hydraulic power transfer unit included a lawn mower, a water sprayer, a snow blower, an air compressor, a water pump, a post-hole digger, an electric generator, a wood chipper, and a log splitter.

In the typical ATV, the engine includes an engine case and a drive shaft or other engine shaft that extends from the engine case. Typically, the engine's drive shaft is accessible beneath the drive shaft cover or starter cover that is historically associated with a so-called "Recoil Starter." In earlier ATVs, the drive shaft cover sometimes included a pull handle to permit the operator to hand start the engine in the event that the electrically-driven starter was inoperable. In more recent ATVs, however, the drive shaft cover often does not include a pull handle and the cover is just a cover.

In one commercial embodiment made according to the '625 and '594 patents, designed for retrofitting a hydraulic power take-off unit to a BRUTE FORCE® model ATV manufactured by KAWASAKI®, the starter cover is removed and a drive plate that carries a female coupler is retrofitted to the drive shaft. Then, the starter cover is replaced with a quick connect case that provides suitable quick connect features along its periphery and has a central aperture that exposes an outward face of the female coupler. Using a suitable quick connect/disconnect mechanism that mates with the features on the case, the hydraulic pump is connected to the quick connect case and, inside of the case, the hydraulic pump's input shaft and associated male coupler are mated with the female coupler.

The quick connect assembly and hydraulic power transfer unit disclosed in the '625 and '594 patents advantageously allows an ATV owner to power various implements by using the ATV's own engine—without requiring a duplicate engine on the implement.

Auger mounts have been developed for all-terrain vehicles (ATVs) as shown, for example, in U.S. Pat. Nos. 5,836,402, 6,681,470 and 8,397,835. In the vehicular auger mounts disclosed in the foregoing patents, however, the auger-holder has been based on a less than optimal slide-like mechanism that makes it somewhat difficult to position the auger and maintain a vertical path in a wide variety of circumstances.

Accordingly, a need has been developed in the art to provide a vehicular auger implement that allows the operator to easily position the auger and which keeps the auger bit vertical as it goes deeper and deeper into the soil.

According to an example embodiment, an auger implement 100 for a vehicle such as an ATV 10 (FIGS. 2 to 4) or UTV 10' (FIGS. 5 to 7, plus 8A and 8B) comprises a central articulating section 120 formed from a spring or gas shock counter balanced double 4 bar linkage that pivotally mounts onto a vehicular mount 110 that provides a 2 axis base or, alternatively, a full gimbal base. This complete unit is then mounted to a mobile power source such as an ATV, UTV, or tractor having a power source, e.g. a hydraulic power take-off arrangement, or for that matter any vehicle, allowing for a single operator to drill vertical holes independent of the slope of the terrain the vehicle is on.

FIG. 1 is a side view of the vehicular auger implement 100. As shown, the implement 100 comprises four portions; specifically, the implement 100 includes a vehicular mount 110 that provides an adjustable base 160, a central articulating section 120 formed from a double 4 bar linkage, an auger support and control section 130, and an auger 140. FIGS. 2 to 4 show the vehicular auger implement 100 attached to the rear of an ATV 10, while FIGS. 5 to 7 show the vehicular auger implement 100 attached to the front of a UTV 10'. FIGS. 8A and 8B illustrate the motion constraint provided by the overall implement 100, particularly by the central articulating section 120.

The vehicular mount 110 has the adjustable base 160 which comprises a two axis base or a full gimbal base. FIG. 1 depicts the case of an adjustable base 160 provided as a two axis base, one where suitable mechanical arrangements are made to provide a pivotal connection 161 about one axis (e.g. about the longitudinal axis relative to the vehicle or "roll") and a pivotal connection 162 about another axis (e.g. about the lateral axis relative to the vehicle, or "pitch").

FIG. 1B shows an alternative embodiment where a single connecting mechanism provides a full gimbal base 164. In such case, the full gimbal base permits simultaneous rotation in any direction and about any desired axis when released, and then locks in place using, for example, a foot pedal arrangement.

FIG. 2 shows two arcuate double-arrowed arcs R, P to identify the "roll" and "pitch" motions to be provided by the two-axis base formed by pivotal connections 161, 162, respectively. The pivotal connections 161, 162 can be provided by simple mechanical arrangement involving plates, bolts, etc., or with a more sophisticated arrangement that does not require tools for adjustment. Through this unique arrangement, even when the vehicle is parked on a slope and is not level relative to the earth, an operator can reposition the adjustable base 160 and compensate for that fact before beginning to manipulate the auger bit 142 and bore a vertical hole notwithstanding the slope.

The mount 100 further comprises a proximal tongue 111 that extends horizontally and is sized and shaped (made e.g. of 2"×2" tubing) for sliding and pinned attachment to a vehicle's tow hitch receiver (although other methods of attachment may be employed, including essentially permanent attachment), a vertical section 112, and a distal end 115 that supports the central articulating section 120 and provides a third connection 163 that permits rotation about a third axis (i.e. about a vertical axis relative to the vehicle, or "yaw").

As shown in FIG. 2, the distal end 115 is formed from a support plate 116 welded to the vertical section 112 and two parallel plates 117 that extend from the support plate 116. The parallel plates 117, 117 provide aligned apertures for pivotally receiving a shaft extending from the central articulating section 120. The result is a pivoting connection 163. The central articulating section 120 in turn supports, at its distal end, an auger support and control section 130 including a mounting plate 131 and a handle 132. The mounting plate 131 in turn supports an auger 140 including a hydraulic motor 141 and an auger bit 142.

The central articulating section 120 may be formed from a double 4-bar linkage. The first 4-bar linkage is generally designated as item 121, and the second 4-bar linkage is generally designated as item 122. As further shown, the first 4-bar linkage is formed by two elongated members connected to a base link 123 and a central link 124. The second 4-bar linkage, in turn, is formed by two elongated members connected between the central link 124 and a distal link 125. In an embodiment, the two 4-bar linkages 121, 122 share the central connecting link 124. In addition, suitable springs or gas shocks 151, 152 are installed, as shown, to aid in the movement of the overall mechanism created by the first and second 4-bar linkages 121, 122.

In some 4-bar linkages, parallel bars remain parallel to one another as the linkage is moved. Consequently, if a "base" bar of some 4-bar linkages is held vertical, the parallel bar will also remain vertical throughout the entire range of motion of the overall linkage. Here, in this dual 4-bar linkage arrangement 120, the linkage is movable throughout a predetermined range of motion that is a function of the geometry chosen and, of significance, will tend to guide the auger bit vertically if properly adjusted before drilling.

It is contemplated that when the vehicle (ATV, tractor, etc.) is parked on a slope, the auger implement 100 would be prepared for use by coarsely manipulating the mechanism 130 to roughly position the tip of the auger bit 142 over the intended hole, and then manipulating the adjustable base 160 to compensate for the slope. In one possible approach to readying the implement 100 for use, the operator would place a bubble level (not shown) on the flat top of the common link 124 (see FIG. 2), and manipulate the adjustable base 160 until the link 124 is level relative to the earth. The operator may then finely re-position the auger tip. At that point, the pre-positioned, pre-leveled link system 120 will inherently guide the auger bit 142 vertically into and out of the soil—all under the guidance of a single operator—as suggested by FIGS. 8A and 8B.

As shown in FIGS. 2, 4, 5, and 7, the auger support and control section 130 comprises a two-way hand control 133 and suitable linkage 134 to permit the operator to control the speed and/or direction of the hydraulic motor 141. In an embodiment, the hydraulic motor 141 is reversible in order to make it easier to withdraw the auger bit 142 from the soil or other substrate.

The central articulating section 120 movably connects to the mount's distal pivot connection 115 and, in an embodiment, features a spring or gas shock counter balanced double 4 bar linkage. The spring or gas shock counter balanced arrangement beneficially relieves the single operator from heavy lifting. Moreover, owing to the double 4 bar linkage, the single operator can easily position the auger implement 100 within its range and then keep the auger bit 142 vertical as the bit 142 goes deeper and deeper into the soil (see FIGS. 8A and 8B). FIGS. 8A and 8B show the auger implement 100 being used to bore a vertical hole while the vehicle 10' is on level ground. If the vehicle 10' were parked on a slope, the operator would simply reposition the adjustable base 160 (as suggested by the multi-axis or gimbal arrangement of FIGS. 1 and 1B, or other suitable mechanism) in order to compensate for the slope before boring the hole.

The unit 100 being mounted to a vehicle (e.g. ATV 10 or UTV 10') makes for much safer operation in that the torque induced by the hydraulic motor 141 is resisted by the weight of the vehicle and not the operator. This also allows for the safe use of more powerful hydraulics. The auger implement 100 is cheaper than a comparable powered auger, safer to use, and much easier to use alone. The auger implement 100 is a one man operational machine and allows the single operator to work for much long periods as it is less demanding on the operator.

While the disclosure above discusses ATV 10 and the UTV 10' as specific examples of vehicles that may support the auger implement 100, the artisan will appreciate that the auger implement 100 may be supported also by other vehicles (e.g., by outdoor power equipment). FIG. 9, for example, shows the auger implement 100 being supported by walk-behind outdoor power equipment 170.

Attention is directed now to FIG. 10, which shows an alternate embodiment 200 of the auger implement 100. The embodiment 200 may be similar to the embodiment 100, except as specifically noted and/or shown, or as would be inherent. Further, those skilled in the art will appreciate that the embodiment 200 (and the embodiment 100) may be modified in various ways, such as through incorporating all or part of any of the previously described embodiments, for example. For uniformity and brevity, corresponding reference numbers may be used to indicate corresponding parts, though with any noted deviations.

The auger implement 100 guides the auger bit 142 in a straight line (i.e., vertically) using two four-bar linkages 121 and 122 that operate in tandem (see FIG. 1). The auger implement 200 may also guide the auger bit 142 in a straight line (i.e., vertically up and down in directions A and B, respectively), but may do so by employing a solitary four-bar linkage. The auger implement 200 may therefore be cheaper to manufacture and maintain as compared to the auger implement 100. The auger implement 200, like the auger implement 100, may be movably supported by the ATV 10, the UTV 10', a tractor, or another vehicle. In embodiments, the auger implement 200 may be movably supported by outdoor power equipment, such as the walk-behind machine 170 (FIG. 9). In an embodiment, a prior art walk-behind mower 300 may be modified to movably support the auger implement 200 (e.g., a front end 302 thereof, see FIG. 11, may be retrofitted to allow the mower 300 to support the implement 200).

The solitary four-bar linkage of the auger implement 200 may be of a type that converts rotational motion into vertical motion, such as a Hoeckens linkage, a Chebyshev's Lambda linkage, etc. FIG. 10 shows the auger implement 200 employing a Hoeckens linkage 202, according to an example embodiment. The Hoeckens linkage, named after Karl Hoecken, is a cognate linkage of the Chebyshev linkage, and has been known now for close to a hundred years. This notwithstanding, prior art auger implements have not employed the Hoeckens linkage (or another solitary four-bar linkage that converts rotational motion into vertical motion as disclosed herein). In embodiments, the auger implement 100, by virtue of the linkage 202 thereof, may allow for the auger bit 142 to drill a hole by moving in the vertical plane without causing or necessitating lateral movement of the vehicle to which the implement 100 is coupled. Such may allow the implement 100 to be operated by a single operator, which may be desirable.

In more detail, the Hoeckens linkage 202 may comprise a first bar 204A, a second bar 204B, a third bar 204C, and a fourth bar 204D. The second bar 204B may be rotatably coupled to the first bar 204A at a pivot point 206; the third bar 204C may be coupled to each of the first bar 204A and the fourth bar 204D; and, the fourth bar 204D have the auger 140 operably coupled thereto. During operation of the auger 140, the first bar 204A may remain stationary whereas the second bar 204B, the third bar 204C, and the fourth bar 204D may move relative to the first bar 204A. Specifically, where the fourth bar 204D (and therefore the auger bit 142) is moving vertically downward in direction B, the second bar 204B may rotate in a clockwise direction (i.e., in direction C) and the third bar 204C may move outward in direction D. FIGS. 12A-12E, on a left side thereof, illustrate successive movement of the linkage bars 204B-204D and the auger bit 142 as the bit 142 is used to bore into the ground. Unlike prior art vehicular auger implements (e.g., a three point hitch in FIG. A2 discussed above), the fourth bar 204D—and thus the auger bit 142—may be capable of moving vertically in directions A and B while the vehicle supporting the auger implement 200 remains stationary.

FIGS. 12A-12E, on the right sides thereof, further represent the range of motion of the auger 140 coupled to the fourth bar 240D as the second bar 204B rotates in the direction C. As can be seen, rotation of the second bar 204B may cause the fourth bar 240D (and the auger 140) to move in a path 208. The path 208, as shown, may be generally D-shaped and have a vertical leg 210 and a curved leg 212. The vertical leg 210 may begin at point 210A and end at point 210B (see FIG. 12B). In embodiments, the auger implement 200 may (but need not necessarily) be configured on a vehicle (e.g., ATV 10, UTV 10', walk-behind equipment 170 and 300, etc.) such that auger bit 142 contacts the ground or other surface when the fourth leg 204D is at or proximate point 210A in the path 208. Such may allow for the bit 142 to bore vertically downwards into the ground for the entire vertical leg 210 of the fourth leg path 208.

The first leg 204A, which, as noted, may remain stationary during operation of the auger 140, may, in embodiments, be selectively movable to allow for proper orientation of the auger bit 142 for operation. Specifically, the first leg 204 may be coupled to a hydraulically actuated arm 214 (FIG.

10), which may be lengthened or shortened in direction E to orient the auger bit 142 as required. Lengthening of the arm 214 may cause the first leg 204A to rotate clockwise in the direction F, and shortening of the arm 214 may cause the first leg 204A to rotate in the opposite direction. Where the surface on which the vehicle supporting the auger implement 200 rests is uneven and/or where the surface being bored using the bit 142 is uneven, the arm 214 may be lengthened or shortened to appropriately orient the bit 142 for operation. The first leg 204A may then be locked in position (using, e.g., a nut and bolt or other locking mechanism) and the bit 142 may thereafter be used to drill vertically into the ground.

The auger 140 may, in embodiments, be operated from a single location. For example, in embodiments, the auger 140 may be hydraulically coupled to a vehicle and include a handle (e.g., handle 132, see FIG. 2) that a user may use to operate the auger 140. Or, for example, the vehicle may comprise an auger control panel accessible by the driver of the vehicle from the driver's seat, and the driver may use this control panel to operate the auger while he is seated in the driver's seat. In other embodiments still, the auger 140 may be controllable remotely using, e.g., a portable control panel that may be wired or wireless. In embodiments, the auger 140 may be operated from one of two or more locations.

In the prior art, after an auger (e.g., the auger 140) operably coupled to a vehicle is used to bore a hole, the auger (or a portion thereof, e.g., the auger bit 142) must be detached from the vehicle for transport and then reattached thereto to bore the next hole. Such may cause much inconvenience and wastage of time. In embodiments, the auger implement 200 may be configured on a vehicle (e.g., the ATV 10, the UTV 10', the walk-behind machines 170, 300, etc.) such that the auger 140 can be transported using the vehicle while the auger 140 is operably coupled to the vehicle. For example, in an embodiment, the auger 140 may be operably coupled to the vehicle such that the tip of the auger bit 142 is some distance away from the ground, which may allow the vehicle to be driven while the auger is operably connected thereto.

When the auger 140 is operating, it may be desirable for the vehicle supporting the auger 140 to be stable so that the auger 140 is properly supported while the bit 142 drills into the ground (or other surface). To this end, during auger operation, it may be desirable for all wheels (e.g., all four wheels) of the vehicle on which the auger implement 200 is mounted to be in contact with the ground. In an embodiment, each wheel of the vehicle (e.g., the vehicle 170, the vehicle 300, or other vehicle) on which the auger implement 200 is mounted may be raised or lowered independently (e.g., using wheel height adjusters, hydraulics, etc.); such may ensure that all wheels of the vehicle are in contact with the ground surface during auger operation even where the ground surface is uneven. In some embodiments, a portion of the vehicle (e.g., the front end 302 of the vehicle 300 modified for the mounting of the auger implement 200) may be moveable with respect to another portion (e.g., the rear end of the vehicle 300) to allow for all vehicle wheels to contact the ground surface during auger operation.

FIGS. 13A through 14 show an alternate auger implement 400. The embodiment 400 may be similar to the embodiment 200 except as specifically noted and/or shown, or as would be inherent. Further, those skilled in the art will appreciate that the embodiment 400 (and the embodiment 200) may be modified in various ways, such as through incorporating all or part of any of the previously described embodiments, for example. For uniformity and brevity, corresponding reference numbers may be used to indicate corresponding parts, though with any noted deviations.

As with the embodiment 200, the embodiment 400 is supported by walk-behind outdoor power equipment 470 (which is generally equivalent to the outdoor power equipment 170). The outdoor power equipment 470 has front and rear ends 470a, 470b, front wheels 472 generally near the front end 470a, rear wheels 474 generally near the rear end 470b, and a power source 475 (e.g., an internal combustion engine, a battery, et cetera). The embodiment 400 deviates from the embodiment 200 primarily in the linkage used to support the auger 140.

Linkage 402 has anchor points 403a, 403b on the outdoor power equipment 470; forward anchor point 403a is located relatively nearer to the front end 470a, and rear anchor point 403b is located relatively nearer to the rear end 470b. As shown in FIG. 13B, for example, it may be desirable for the rear anchor point 403b to be located rearwardly of the rear wheels 474. The outdoor power equipment 470 may, for example, include a mounting plate 476, and a support member 477 may extend from the mounting plate 476 to the rear anchor point 403b. In effect, the support member 477 may extend the length of the outdoor power equipment 470 to arrive at desired spacing between the front and rear anchor points 43a, 403b in a lightweight and inexpensive manner. And by removably (e.g., through bolts, pins, etc.) coupling the support member 477 to the mounting plate 476, the support member 477 may be easily coupled to the mounting plate 476 after the embodiment 400 is shipped, reducing the shipping footprint of the embodiment 400 and thus costs.

A first link 411 of the linkage 402 is coupled to the outdoor power equipment 470 (which may include bracing or supports extending from other portions of the outdoor power equipment 470) and pivots about the forward anchor point 403a. As used herein, the term "link" refers to a rotatable component or assembly of the linkage 402 which is rigid and maintains a configuration that may be used to support or turn another component or assembly; a link does not have to be linear or located in a single plane. A second link 412 is coupled to and pivots about the first link 411, and a third link 413 is coupled to and pivots about both the outdoor power equipment 470 (at the rear anchor point 403b) and the second link 412. The linkage 402 is shown schematically in FIG. 14.

The first link 411 has a working distance 411a defined by a distance between the forward anchor point 403a and a point of rotation 404a between the first and second links 411, 412. The term "working distance" is used herein to denote the distance relevant to the performance of the linkage 402; each link may extend beyond the working distance. Additionally, all distances are measured not three-dimensionally between the actual points noted, but are rather the closest distances between the rotational axes of the noted points; in other words, the distances are measured in a side profile (for example, as in FIG. 13B) without regard to depth. The second link 412 supports the auger 140, and a working distance 412a of the second link 412 is defined by a distance between the point of rotation 404a between the first and second links 411, 412 on one end and an intersection point 404b of the second link 412 and an axis 412a (FIG. 13B) of the auger bit 142 on another end. Viewed differently, the working distance 412a is made up of first and second working distances 412a', 412a", with the first working distance 412a' being a distance between the point of rotation 404a and a point of rotation 404c between the second link 412 and the third link 413 and with the second working distance 412a" being a distance between the point of rotation 404c and the intersection point 404b. The third link 413 has a working distance 413a between the rear anchor point 403b and the point of rotation 404c.

While the linkage 402 is described herein as having three links and two attachment points to the outdoor power equipment 470, those skilled in the art will appreciate that, as for example shown in FIGS. 13A and 13C, the linkage 402 may in essence have two of all of the components that are described in detail, with one set of components generally located along one side of the outdoor power equipment 470 and another set of components generally located along another side of the outdoor power equipment 470 (though, for example, a portion of the second link 412 or other components may be common to both sets). Having these two sets (or even more sets) of components in the linkage 402 may provide increased stability for the auger 140, reduce the strength requirements of the respective links, and reduce undesirable torque in the overall linkage 402. Another way to conceptualize this is to consider that the links may have depth and multiple attachment and pivot points.

To provide vertical movement of the auger bit 142 during drilling operations, it may be particularly important for the links 411, 412, 413 to be sized such that the working distance 413a of the third link 413 when squared is equal to the working distance 412a' multiplied by the working distance 412a". Moreover, it may be desirable for the point of rotation 404a to be horizontally aligned with (i.e., in the same horizontal plane as) or higher than the rear anchor point 403b when the point of rotation 404a is vertically aligned with (i.e., in the same vertical plane as) the forward anchor point 403a, and it may be particularly desirable for the point of rotation 404a to be higher than the rear anchor point 403b when the point of rotation 404a is vertically aligned with the forward anchor point 403a.

The linkage 402 shown in FIGS. 13A through 13D has a pair of plates 451 each defining a first link 411, coupled together by a tubular support 452; a tubular U-shaped member 453, a beam 454, and part of the auger 140 collectively defining the second link 412; and another U-shaped member 455 and a bracket 456 collectively defining the third link 413. A pair of telescoping members 460 are pivotally coupled to the outdoor power equipment 470 and to the U-shaped member 455, and the telescoping members 460 may help maintain alignment in the linkage 402. In some embodiments, the telescoping members 460 may be pneumatic or hydraulic pistons actuating, or biasing against, rotational movement of the third link 413. In the embodiment shown in FIGS. 13A through 13D, the telescoping members 460 are hydraulic pistons for actuating rotational movement of the third link 413 (and thus movement throughout the linkage 402). In other embodiments, an actuator may move the first link 411 for causing movement throughout the linkage 402. In addition to hydraulic and pneumatic pistons, gears and other actuators may be used to move the linkage 402.

In use, the auger implement 400 may begin with the linkage 402 at a raised configuration 400a (FIGS. 13A and 13B), with the first link 411 rotated such that the point of rotation 404a is vertically aligned with the forward anchor point 403a or rotated toward the rear end 470b from the vertical alignment. The user may position the auger bit 142 as desired by moving the outdoor power equipment 470. Once the auger bit 142 is positioned, the user may actuate the auger 140 to turn the auger bit 142, and the user may cause the auger bit 142 to lower by actuating the telescoping members 460. More particularly, the telescoping members 460 may cause the third link 413 to rotate toward the front end 470a, which in turn causes the first link 411 to rotate toward the front end 470a and the second link 412 and the auger 140 to lower. These steps may be performed in reverse to return the auger implement 400 to the raised configuration 400a. The auger implement 400 is shown with the linkage 402 at a lowered configuration 400b in FIGS. 13C and 13D. And when the linkage 402 is at the lowered configuration 400b, the linkage 402 may be entirely below a top of the outdoor power equipment 470; this may be beneficial for shipping and storage.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims.

The invention claimed is:

1. A vehicular auger implement, comprising:
   an auger having a bit:
   a walk-behind vehicle having a front end and a rear end located opposite the front end, a forward anchor point located near the front end and a rear anchor point located near the rear end;
   a linkage coupling the auger to the walk-behind vehicle, the linkage comprising:
      a first link coupled to the walk-behind vehicle and being rotatable about the forward anchor point;
      a second link coupled to and being rotatable about the first link the second link supporting the auger; and
      a third coupled to and being rotatable about the second link the third link being coupled to the walk-behind vehicle and being rotatable about the rear anchor point; and
   an actuator for causing the linkage to move between raised and lowered configurations.

2. The vehicular auger implement of claim 1, wherein all of the linkage is below atop of the walk-behind vehicle when the linkage is at the lowered configuration.

3. The vehicular auger implement of claim 1, wherein:
   the first link, the second link, and the third link each have a respective working distance; the second link has a first portion extending from the first oink and a second portion extending from the auger, the first and second portions both ending and meeting at a point of rotation between the second link and the third link, the first and second portions each having a respective working distance;
   the square of the working distance of the third link is generally equal to the working distance of the first portion multiplied by the working distance of the second portion.

4. The vehicular auger implement of claim 3, wherein a point of rotation between the first and second links is at least as high as the rear anchor point when the point of rotation between the first and second links is vertically aligned with the forward anchor point.

5. The vehicular auger implement of claim 3, wherein a point of rotation between the first and second links is high than the rear anchor point when the point of rotation between the first and second links is vertically aligned with the forward anchor point.

6. The vehicular auger implement of claim 5, wherein all of the linkage is below a top of the walk-behind vehicle when the linkage is at the lowered configuration.

7. The vehicular auger implement of claim 6, wherein at least a portion of the linkage is above the top of the walk-behind vehicle when the linkage is at the raised configuration.

8. The vehicular auger implement of claim 1, wherein the actuator is a gas shock.

9. The vehicular auger implement of claim 8, wherein the gas shock is operably coupled to the third link.

10. The vehicular auger implement of claim 1, wherein the auger bit travels vertically when moving through a ground surface.

11. The vehicular auger implement of claim 1, wherein:
the walk-behind vehicle has a front wheel relatively near the walk-behind vehicle front end;
the walk-behind vehicle has a rear wheel relatively near the walk-behind vehicle rear end; and
the rear anchor point is rearward of the rear wheel.

12. The vehicular auger implement of claim 1, wherein a point of rotation between the first and second links is higher than the rear anchor point when the point of rotation between the first and second links is vertically aligned with the forward anchor point.

13. The vehicular auger implement of claim 12, wherein the rear anchor point is higher than the forward anchor point.

14. The vehicular auger implement of claim 1, wherein the second link includes a tubular U-shaped member.

15. The vehicular auger implement of claim 1, wherein the auger includes a hydraulic motor configured to operate the bit and a hand control operably coupled to the hydraulic motor, the hand control selectively operating the hydraulic motor.

16. A vehicular auger implement, comprising:
an auger having a bit;
a walk-behind vehicle having a front end and a rear end located opposite the front end, a forward anchor point located near the front end, and a rear anchor point higher than the forward anchor point, the rear anchor point located near the rear end; and
a linkage coupling the auger to the walk-behind vehicle, the linkage being movable between raised and lowered configurations and comprising:
a first link coupled to the walk-behind vehicle and being rotatable about the forward anchor point;
a second link coupled to and being rotatable about the first link the second link supporting the auger; and
a third link coupled to and being rotatable about the second link, the third link being coupled to the walk-behind vehicle and being rotatable about the rear anchor point.

17. The vehicular auger implement of claim 16, wherein:
the walk-behind vehicle has a front wheel relatively near the walk-behind vehicle front end;
the walk-behind vehicle has a rear wheel relatively near the walk-behind vehicle rear end;
the forward anchor point is between the front and rear wheels; and
the rear anchor point is rearward of the rear wheel.

18. The vehicular auger implement of claim 16, wherein:
the first link, the second link, and the third link each have a respective working distance;
the second link has a first portion extending from the first link and a second portion extending from the auger, the first and second portions both ending and meeting at a point of rotation between the second link and the third ink, the first and second portions each having a respective working distance;
the square of the working distance of the third link is generally equal to the working distance of the first portion multiplied by the working distance of the second portion.

19. The vehicular auger implement of claim 18, wherein:
a point of rotation between the first and second links is higher than the rear anchor point when the point of rotation between the first and second links is vertically aligned with the forward anchor point;
all of the linkage is below a top of the walk-behind when the linkage is at the lowered configuration; and
at least a portion of the linkage is above the top of the walk-behind vehicle when the linkage is at the raised configuration.

20. The vehicular auger implement of claim 16, wherein the walk-behind vehicle further includes a plurality of front wheels and a plurality of rear drive wheels, wherein the auger and the rear drive wheels are operable from a single location.

* * * * *